(12) United States Patent
Ito et al.

(10) Patent No.: US 12,178,674 B2
(45) Date of Patent: *Dec. 31, 2024

(54) WORKPIECE UNIT AND PRODUCING METHOD THEREOF

(71) Applicant: KURARAY NORITAKE DENTAL INC., Kurashiki (JP)

(72) Inventors: Yoshihisa Ito, Miyoshi (JP); Tetsuo Yamada, Nagoya (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 899 days.

This patent is subject to a terminal disclaimer.

(21) Appl. No.: 15/559,143

(22) PCT Filed: Mar. 18, 2016

(86) PCT No.: PCT/JP2016/058766
§ 371 (c)(1),
(2) Date: Sep. 18, 2017

(87) PCT Pub. No.: WO2016/148288
PCT Pub. Date: Sep. 22, 2016

(65) Prior Publication Data
US 2018/0064515 A1    Mar. 8, 2018

(30) Foreign Application Priority Data
Mar. 19, 2015   (JP) ................. 2015-056571

(51) Int. Cl.
*A61C 13/00*    (2006.01)
*A61C 5/77*    (2017.01)
(Continued)

(52) U.S. Cl.
CPC .............. *A61C 13/083* (2013.01); *A61C 5/77* (2017.02); *A61C 7/14* (2013.01); *A61C 8/00* (2013.01); *A61C 13/0022* (2013.01)

(58) Field of Classification Search
None
See application file for complete search history.

(56) References Cited

U.S. PATENT DOCUMENTS

| 6,482,284 B1 | 11/2002 | Reidt et al. |
| 6,627,327 B2 | 9/2003 | Reidt et al. |

(Continued)

FOREIGN PATENT DOCUMENTS

| CN | 1479593 A | 3/2004 |
| CN | 102325506 A | 1/2012 |

(Continued)

OTHER PUBLICATIONS

Machine translation of DE 202013103515 U1 via google patents (translated Oct. 23, 2020) (Year: 2013).*

(Continued)

*Primary Examiner* — Elizabeth Collister
(74) *Attorney, Agent, or Firm* — Oblon, McClelland, Maier & Neustadt, L.L.P.

(57) ABSTRACT

Provided are: a workpiece unit (10) that makes it possible to attach a holding member (1) to a workpiece body (1) at a suitable position and that minimizes displacement of the holding member (2) after attachment thereof; and a method for producing the workpiece unit (10). The workpiece unit (10) is provided with a workpiece body (1) and a holding member (2) arranged on at least a part of the outer circumference (1c) of the workpiece body (1). The workpiece body (1) comprises at least one first positioning section (1d) at a part facing the holding member (2). The holding member (2) comprises a second positioning section (2d) that engages with at least a part of the first positioning section (1d).

22 Claims, 37 Drawing Sheets

(51) Int. Cl.
*A61C 7/14* (2006.01)
*A61C 8/00* (2006.01)
*A61C 13/083* (2006.01)

(56) References Cited

U.S. PATENT DOCUMENTS

| | | | |
|---|---|---|---|
| 8,506,294 | B2 | 8/2013 | Althoff et al. |
| 9,212,065 | B2 | 12/2015 | Yamada et al. |
| 2003/0073394 | A1 | 4/2003 | Reidt et al. |
| 2003/0132539 | A1 | 7/2003 | Althoff et al. |
| 2004/0072121 | A1 | 4/2004 | Filser et al. |
| 2005/0254064 | A1 | 11/2005 | Basler et al. |
| 2009/0075238 | A1* | 3/2009 | Galehr .......... A61C 13/0022 433/213 |
| 2010/0028836 | A1* | 2/2010 | Gubler .......... A61C 5/77 433/223 |
| 2011/0291343 | A1 | 12/2011 | McMurtry et al. |
| 2013/0218323 | A1 | 8/2013 | Reck et al. |
| 2014/0328746 | A1 | 11/2014 | Yamada et al. |

FOREIGN PATENT DOCUMENTS

| | | | |
|---|---|---|---|
| DE | 203 16 004 U1 | 4/2004 | |
| DE | 102007013675 B4 * | 1/2011 | ......... A61C 13/0022 |
| DE | 20 2013 103 515 U1 | 11/2013 | |
| JP | 0336135 U | 4/1991 | |
| JP | 2004/507316 A | 3/2004 | |
| JP | 2006-521842 A | 9/2006 | |
| JP | 2007/054651 A | 3/2007 | |
| JP | 2009-527339 | 7/2009 | |
| JP | 2010-22610 A | 2/2010 | |
| JP | 2013-119485 A | 6/2013 | |
| JP | 2014-033872 | 2/2014 | |
| JP | 2014/218389 A | 11/2014 | |
| WO | 95/30382 A1 | 11/1995 | |
| WO | 2011/029615 A1 | 3/2011 | |
| WO | WO-2013117540 A1 * | 8/2013 | ......... A61C 13/0022 |

OTHER PUBLICATIONS

Machine translation of WO 9530382 via espace.net (translated Dec. 9, 2019) (Year: 1995).*
Machine translation of DE 102007013675 B4; Translated via google patents Sep. 17, 2021. (Year: 2007).*
Machine translation of JP 2010-022610A (via hhttps://www.j-platpat.inpit.go.jp/, translated Jul. 29, 2022) (Year: 2010).*
Machine translation of WO 2013117540 A1 via Espacenet translated Nov. 17, 2022 (Year: 2013).*
Extended European Search Report issued Sep. 24, 2018 in European Patent Application No. 16765117.3, citing documents AA, AB, AO and AP therein, 8 pages.
International Preliminary Report on Patentability issued Sep. 9, 2017 in PCT/JP2016/058766 (submitting English translation only).
Japanese Office Action issued Apr. 21, 2020 in Japanese Patent Application No. 2017-506223 (with unedited computer generated English translation), citing document AO therein, 9 pages.
Combined Chinese Office Action and Search Report issued on Nov. 22, 2019, in Patent Application No. 201680016763.2, citing document AO therein, 13 pages (with English translation and English Translation of Category of Cited Documents).
International Search Report issued May 24, 2016, in PCT/JP2016/058766 filed Mar. 18, 2016.
Office Action in corresponding Japanese Patent Application No. 2017-506223, dated Jun. 17, 2021. (w/English Machine Translation).
Office Action issued Sep. 28, 2021 in corresponding Japanese Patent Application No. 2017-506223 (with English Translation), citing document AA therein, 16 pages.
Notification of Reason for Refusal issued Mar. 28, 2022 in Korean Patent Application No. 10-2017-7029870 (with English machine translation), citing document AO therein, 13 pages.
Office Action issued Oct. 4, 2022 in corresponding Japanese Patent Application No. 2021-135321 (w/ Computer-generated English Translation), citing documents 15-16, 11 pages.

* cited by examiner

[Fig. 1]
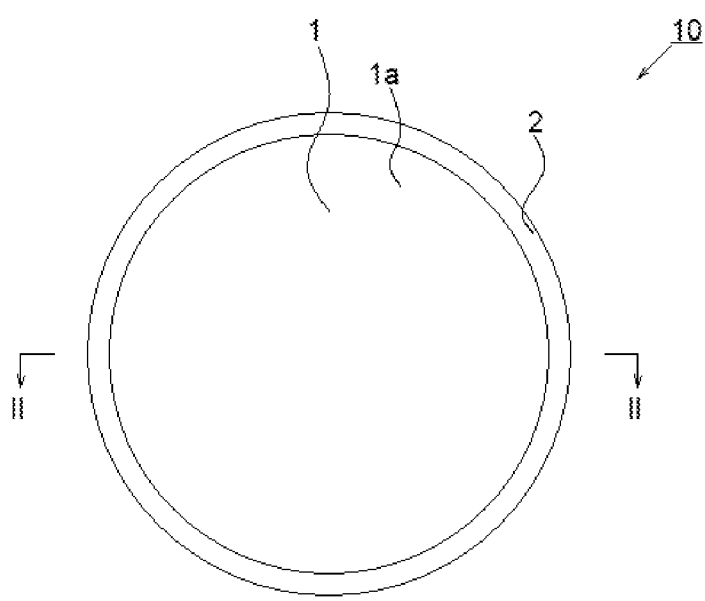

[Fig. 2]
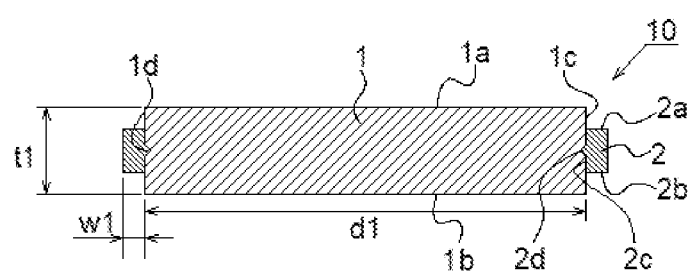

[Fig. 3]
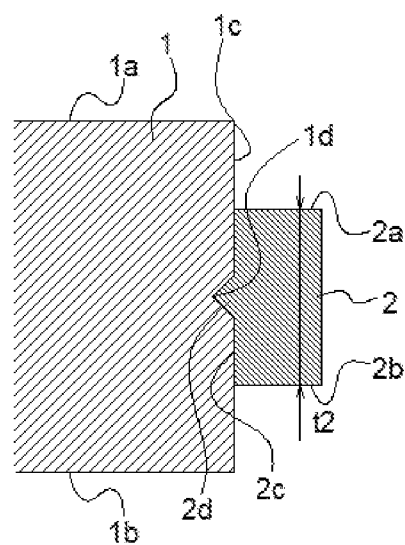

[Fig. 4]
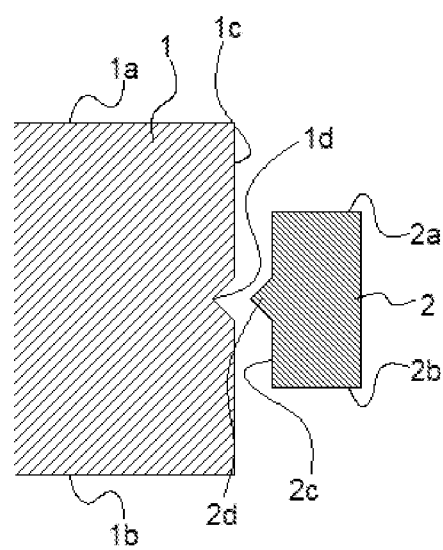

[Fig. 5]
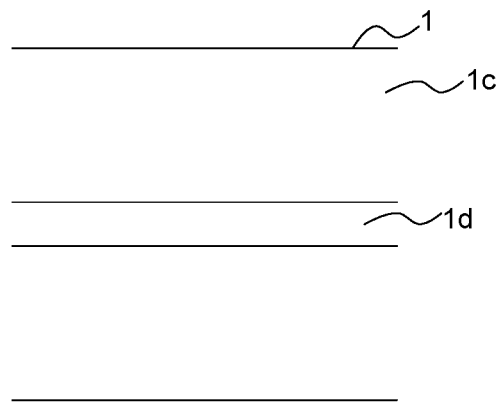

[Fig. 6]
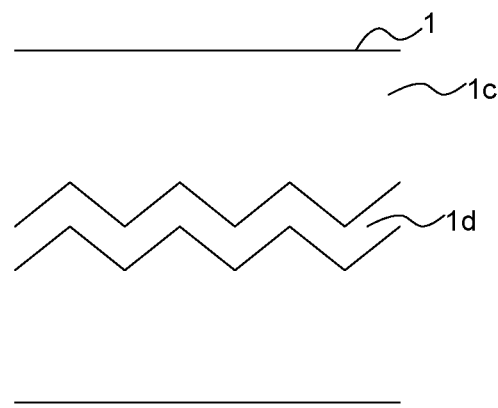

[Fig. 7]
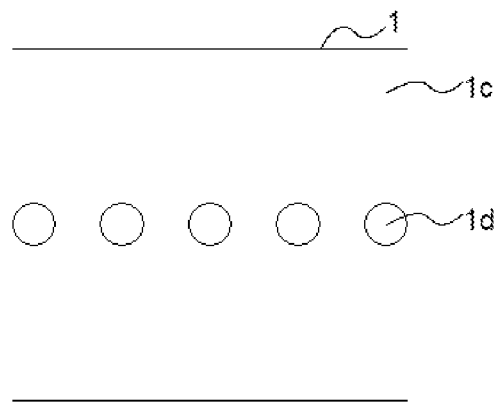

[Fig. 8]
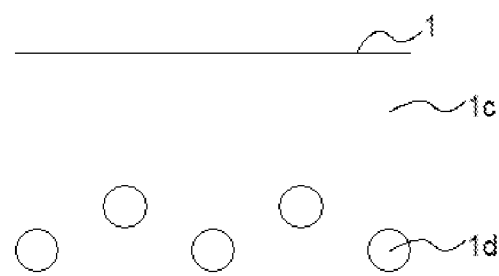

[Fig. 9]
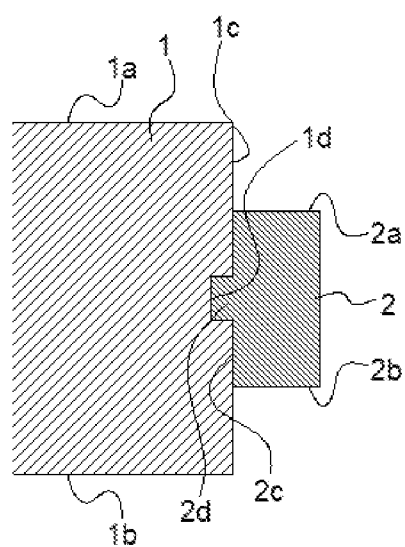

[Fig. 10]
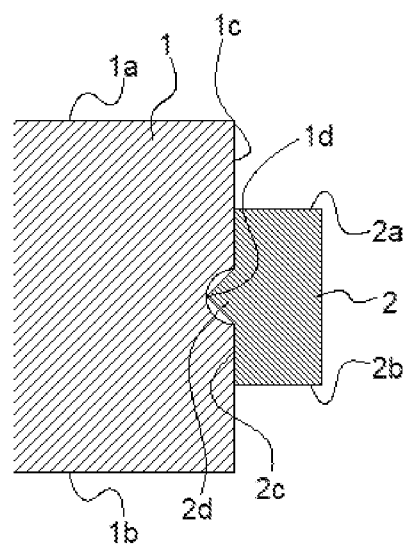

[Fig. 11]
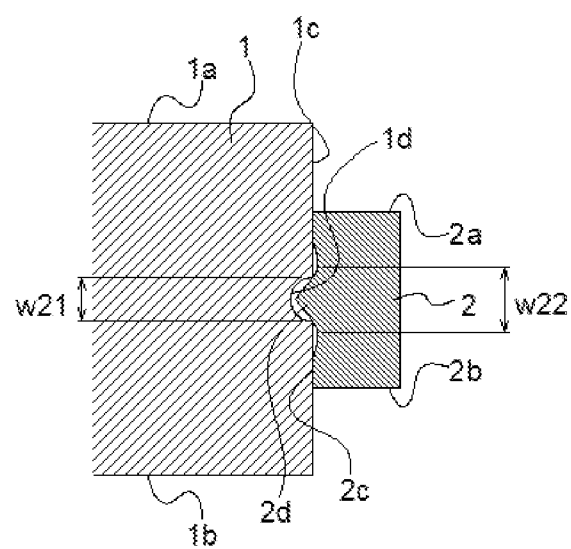

[Fig. 12]
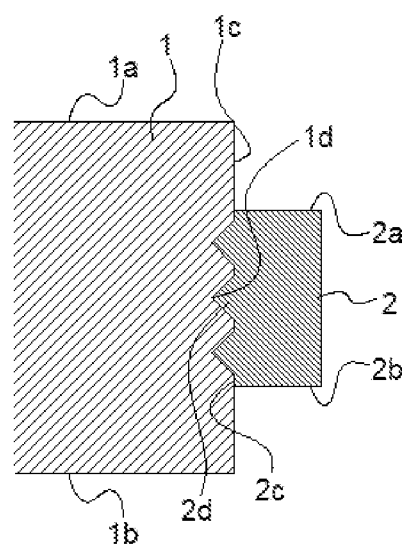

[Fig. 13]
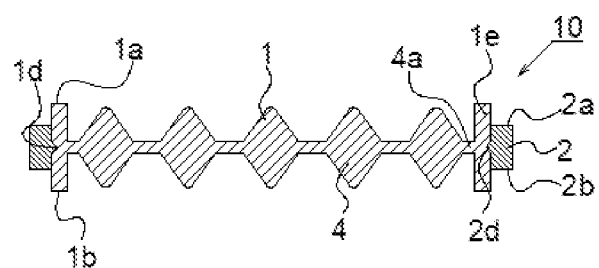

[Fig. 14]
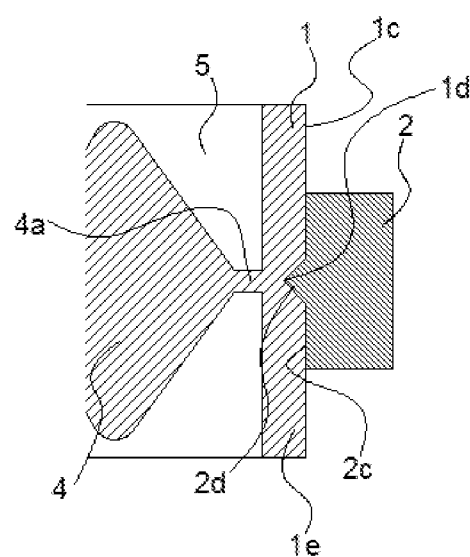

[Fig. 15]
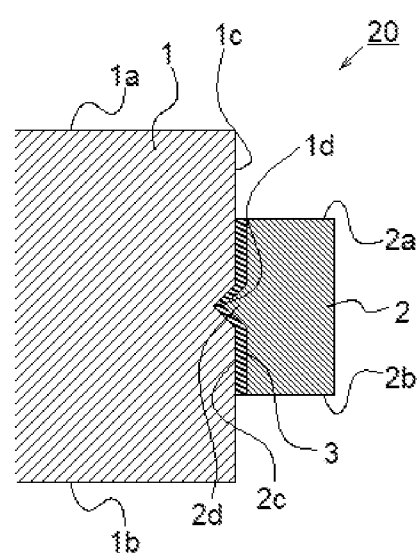

[Fig. 16]
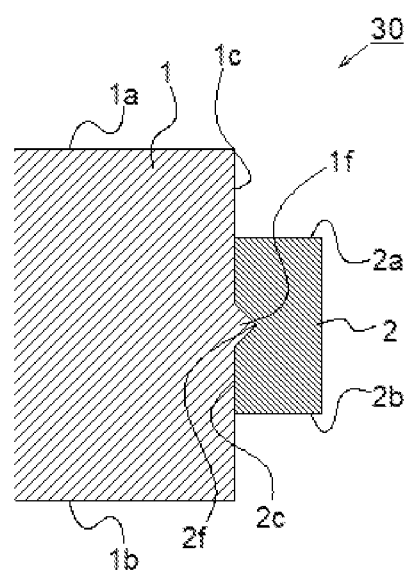

[Fig. 17]
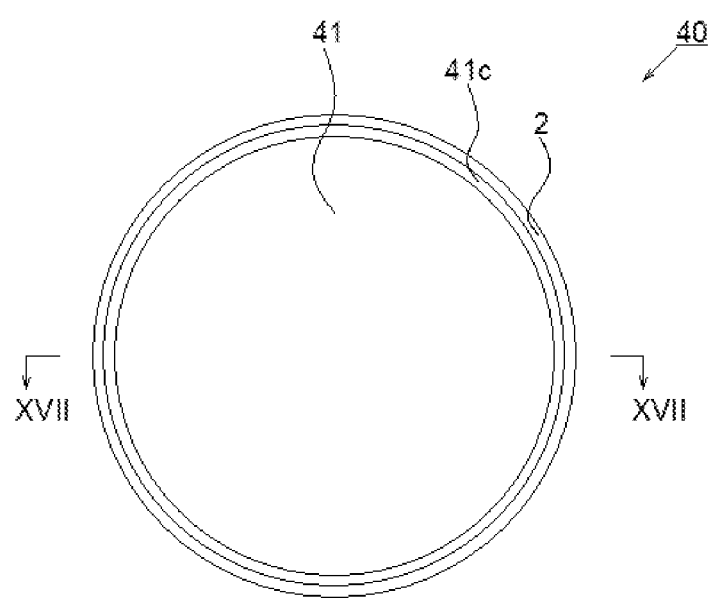

[Fig. 18]
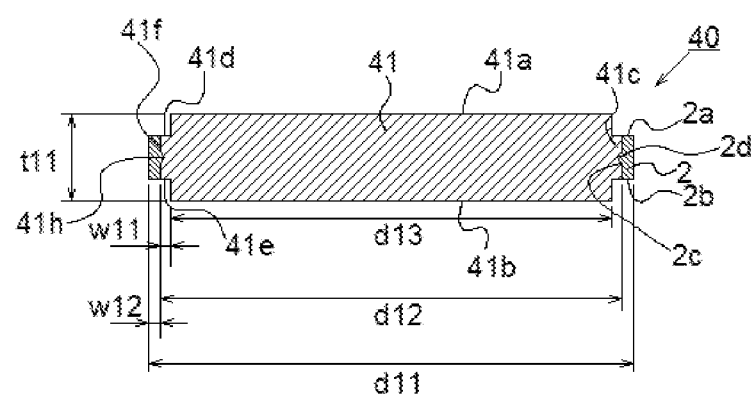

[Fig. 19]
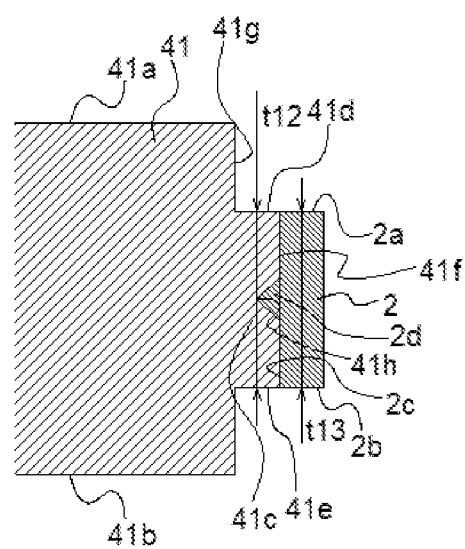

[Fig. 20]
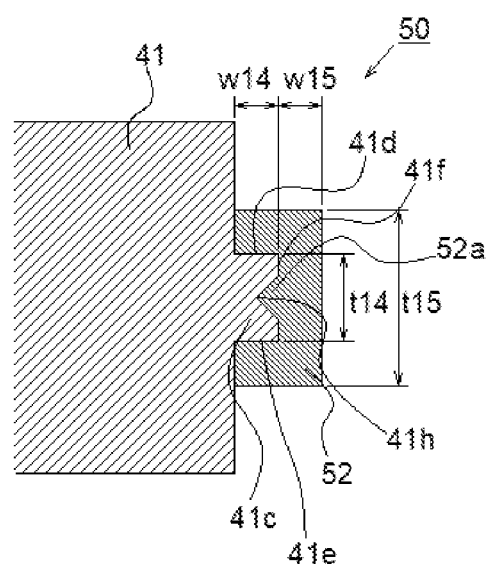

[Fig. 21]
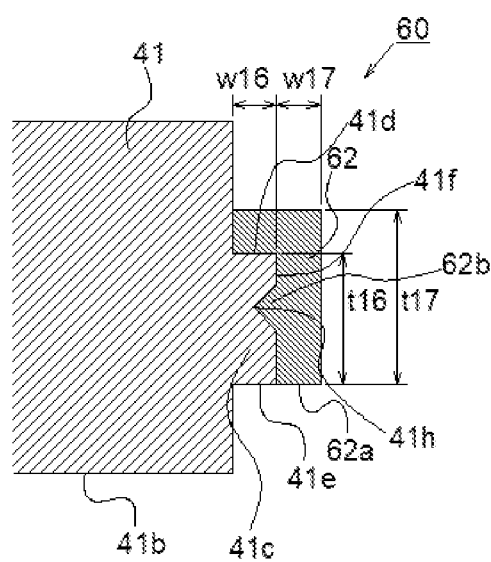

[Fig. 22]
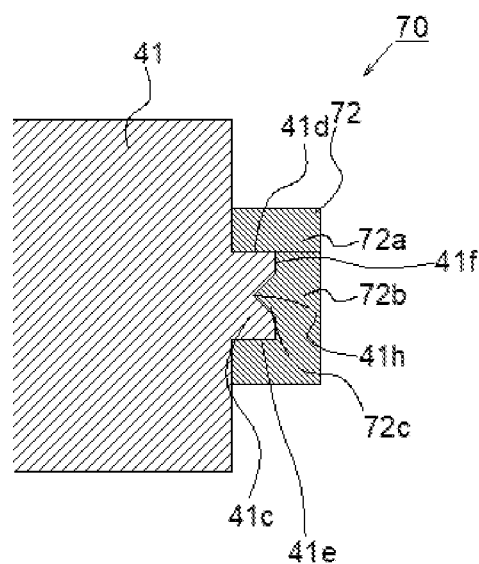

[Fig. 23]
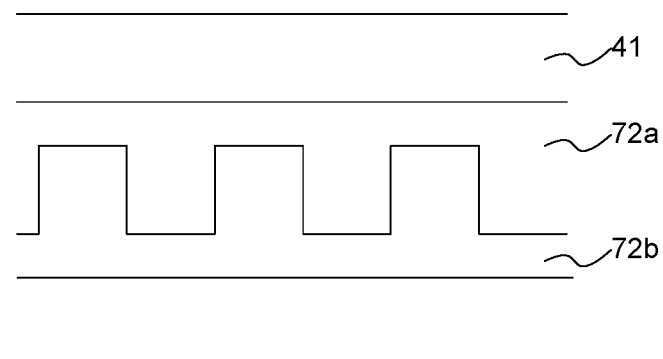

[Fig. 24]
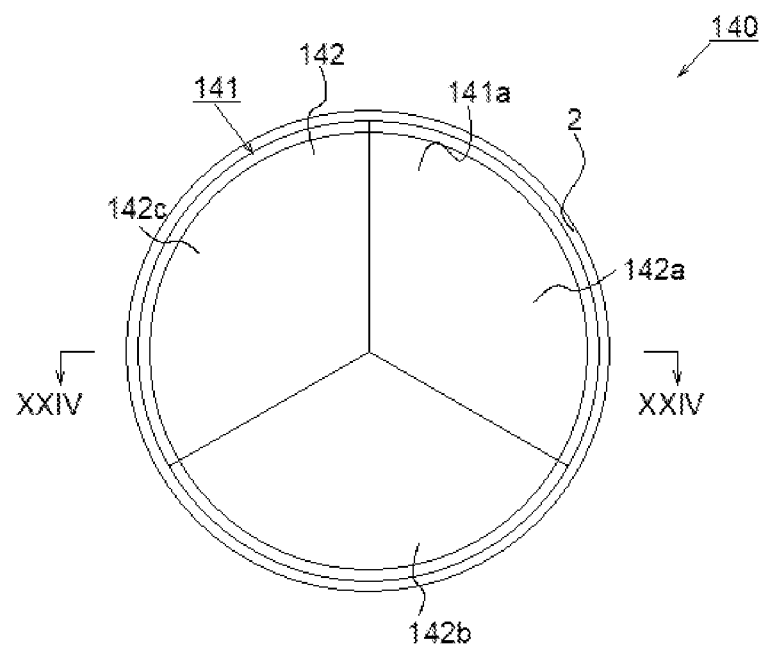

[Fig. 25]
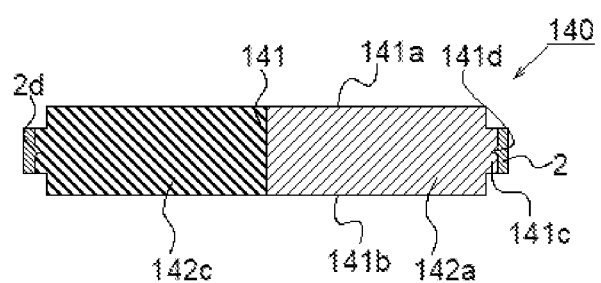

[Fig. 26]
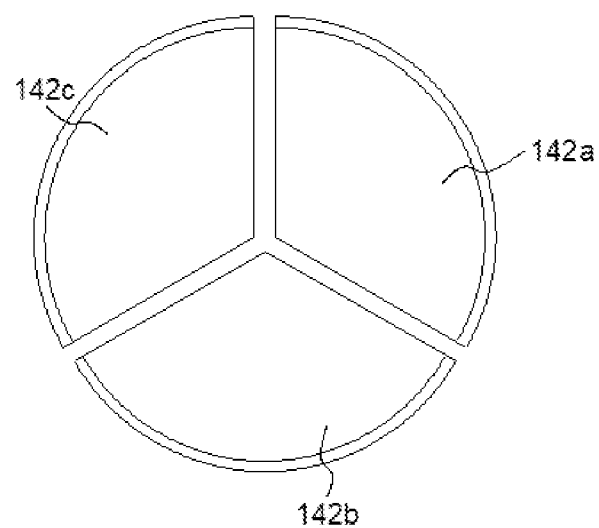

[Fig. 27]
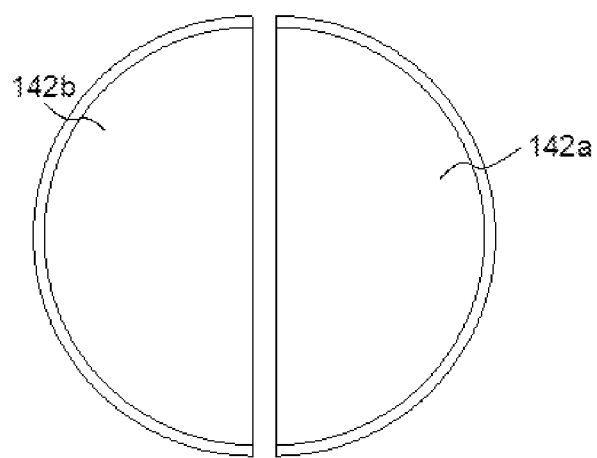

[Fig. 28]
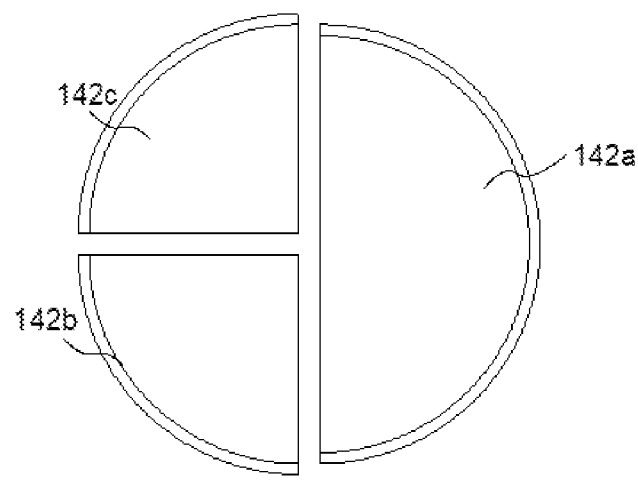

[Fig. 29]
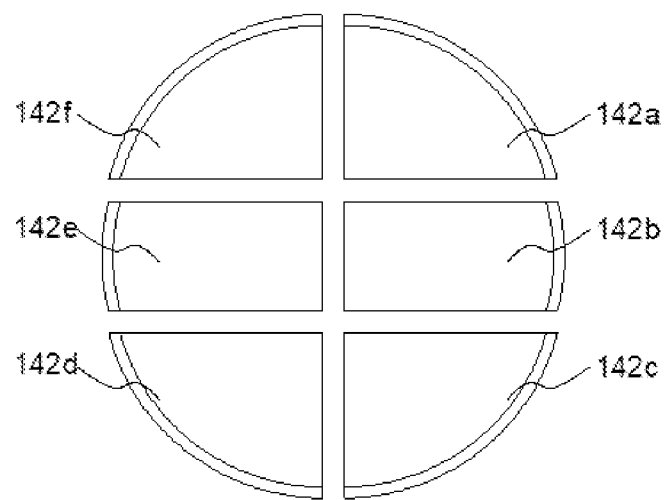

[Fig. 30]
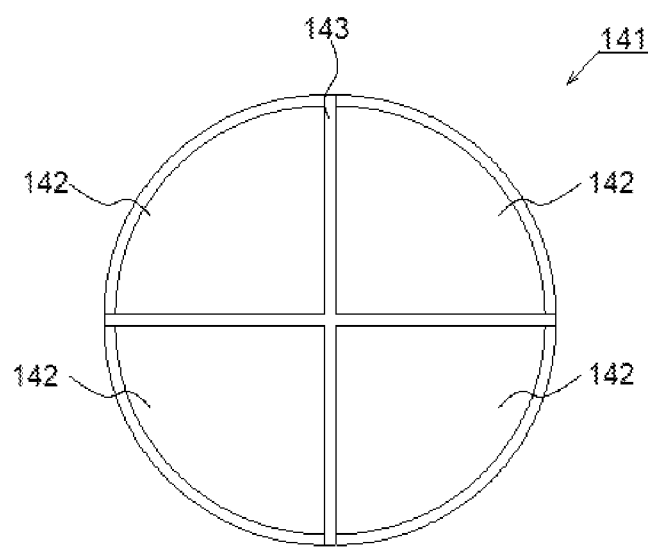

[Fig. 31]
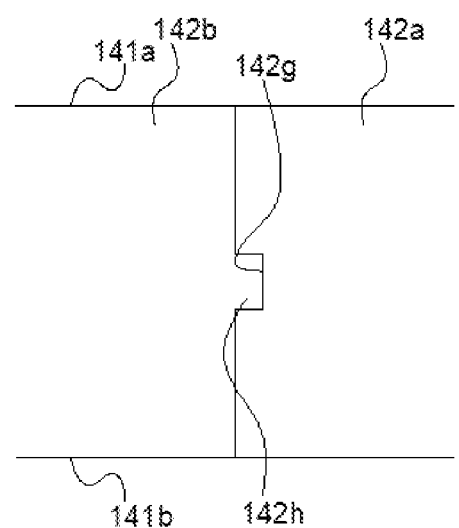

[Fig. 32]
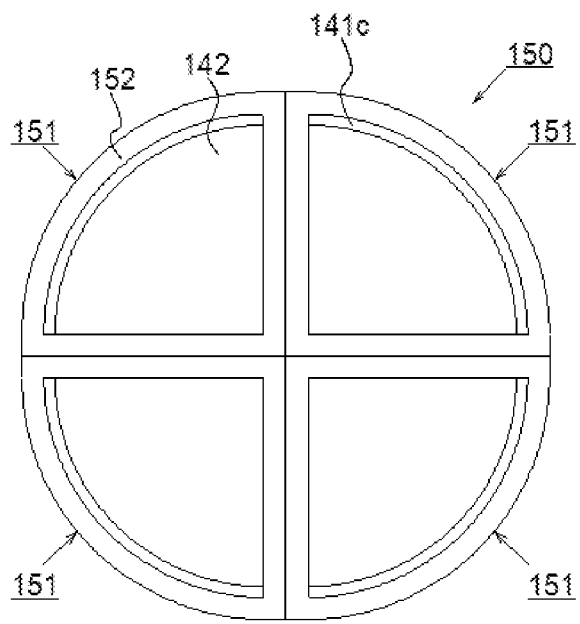

[Fig. 33]
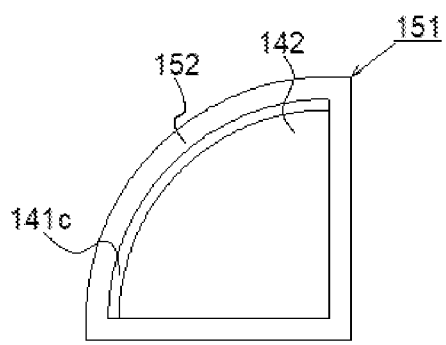

[Fig. 34]
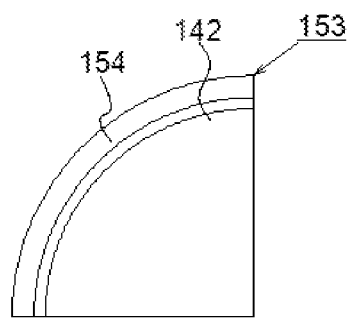

[Fig. 35]
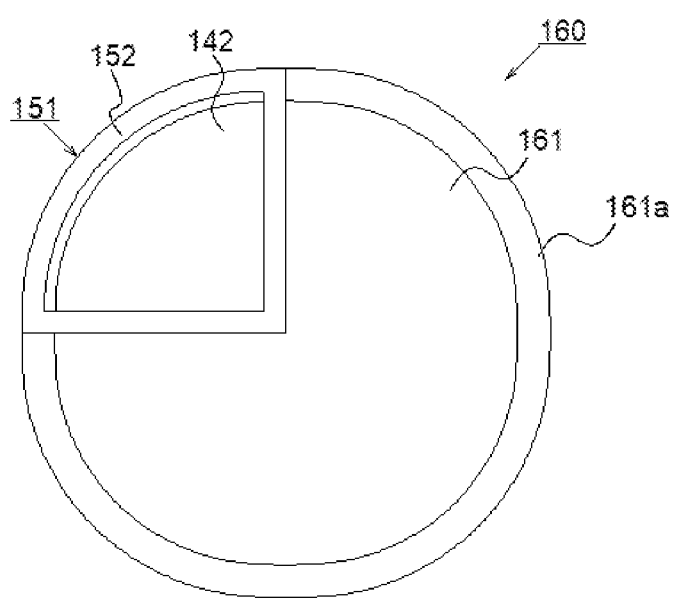

[Fig. 36]
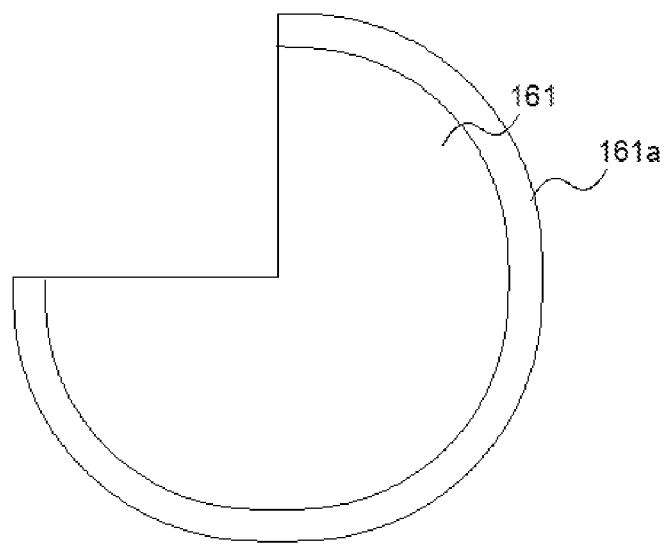

[Fig. 37]
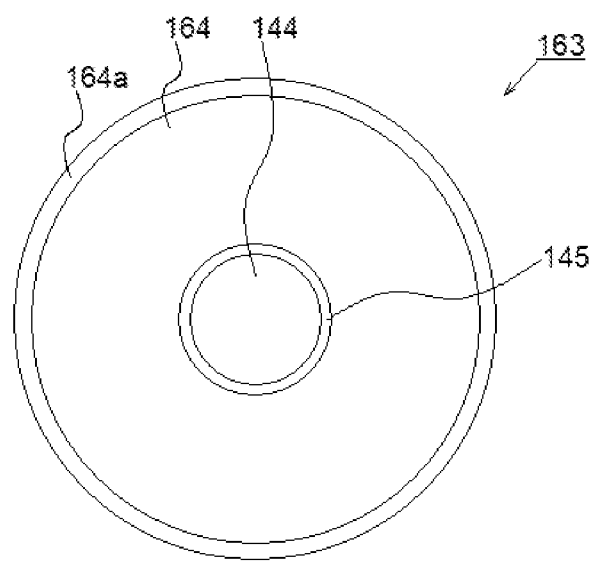

WORKPIECE UNIT AND PRODUCING METHOD THEREOF

CROSS-REFERENCE TO RELATED APPLICATION

The present invention is based on the priority of Japanese patent application No. 2015-056571 (filed on Mar. 19, 2015), the disclosure of which is incorporated herein in its entirety by reference thereto.

TECHNICAL FIELD

The present invention relates to a workpiece unit which comprises a workpiece body to be mechanically machined and a producing method thereof.

BACKGROUND

In a case of machining a workpiece body, such as ceramic, metal and the like into a 3-dimensional shape, a machining process is carried out while holding end portions of a workpiece unit. Herein, the workpiece body is also referred to as "blank". For example, in the dental art field, an outer edge region of zirconia having a circular plate (disk) shape as the workpiece body is held by a machining apparatus and cutting out of a prosthesis is carried out.

Herein, in a producing method for dental prosthetic material disclosed in Patent Literature (PTL) 1, a ring is attached onto an outer edge of the blank with an adhesive agent so that the ring is fixed onto a chuck of the machining apparatus, whereby the blank is fixed onto the machining apparatus.

CITATION LIST

Patent Literatures

PTL 1: International application publication: WO95/30382

SUMMARY

Technical Problem

The following analyses are given from views of the present invention.

In the producing method for the dental prosthetic material disclosed in Patent Literature 1, a holding member (ring) is attached onto a smooth circumferential portion on a workpiece body (blank) via adhesive material. However, in a mode disclosed in Patent Literature 1, it is difficult to accurately attach the holding member onto a predetermined position, thus a position of the holding member is sometimes displaced from the predetermined position. If the holding member is not attached onto the workpiece body at the predetermined position, the position of the workpiece body relative to the machining apparatus would be displaced. Therefore, there is a case where the workpiece body may not be machined into a pre-designed shape.

In addition, even in a case where the holding member may be attached onto the workpiece body at a pertinent position, the position of the holding member relative to the workpiece body is sometimes displaced due to environment or load during machining, transportation, storage and the like. In such case, a problem would occur like as above.

Therefore, it is desired that the holding member may be attached onto the workpiece body at a pertinent position and that shifting or displacement of the holding member is suppressed after attachment.

Solution to Problem

According to a first aspect of the present invention, a workpiece unit comprises a workpiece body and a holding member arranged on at least one part of circumferential portion of the workpiece body. The workpiece body comprises the workpiece body comprises at least one first positioning portion at a part facing the holding member. The holding member comprises a second positioning portion engaged with at least one part of the first positioning portion.

According to second aspect of the present invention, a producing method of a workpiece unit comprises a step of preparing a workpiece body comprising a first positioning portion on a circumferential portion, a step of preparing a holding member comprising a second positioning portion, and a step of attaching the holding member onto the circumferential portion of the workpiece body so that the first positioning portion corresponds to the second positioning portion.

Advantageous Effects of the Invention

The holding member may be attached to a pertinent position on the workpiece body. Even after attachment of the holding member, shifting or displacement of the holding member may be suppressed.

BRIEF DESCRIPTION OF THE DRAWINGS

FIG. 1 shows a schematic plan view of the workpiece unit according to a first exemplary embodiment of the present disclosure.

FIG. 2 shows a schematic sectional view of the workpiece unit on II-II line in FIG. 1.

FIG. 3 shows a schematic partial view of the workpiece unit according to the first exemplary embodiment of the present disclosure.

FIG. 4 shows a schematic disassembled view of the workpiece unit according to the first exemplary embodiment of the present disclosure.

FIG. 5 shows a schematic plan view of an example of a first positioning portion and a second positioning portion.

FIG. 6 shows a schematic plan view of an example of a first positioning portion and a second positioning portion.

FIG. 7 shows a schematic plan view of an example of a first positioning portion and a second positioning portion.

FIG. 8 shows a schematic plan view of an example of a first positioning portion and a second positioning portion.

FIG. 9 shows a schematic sectional view of an example of a first positioning portion and a second positioning portion.

FIG. 10 shows a schematic sectional view of an example of a first positioning portion and a second positioning portion.

FIG. 11 shows a schematic sectional view of an example of a first positioning portion and a second positioning portion.

FIG. 12 shows a schematic sectional view of an example of a first positioning portion and a second positioning portion.

FIG. 13 shows a schematic sectional view of a machined workpiece unit according to the first exemplary embodiment of the present disclosure.

FIG. 14 shows a schematic partial view of a machined workpiece unit according to the first exemplary embodiment of the present disclosure.

FIG. 15 shows a workpiece unit according to a second exemplary embodiment of the present disclosure.

FIG. 16 shows a schematic partial view of a workpiece unit according to a third exemplary embodiment of the present disclosure.

FIG. 17 shows a schematic plan view of a workpiece unit according to a fourth exemplary embodiment of the present disclosure.

FIG. 18 shows a schematic sectional view of a workpiece unit on XVII-XVII in FIG. 17.

FIG. 19 shows a schematic partial view of a workpiece unit according to the fourth exemplary embodiment of the present disclosure.

FIG. 20 shows a schematic partial view of a workpiece unit according to a fifth exemplary embodiment of the present disclosure.

FIG. 21 shows a schematic partial view of a workpiece unit according to a sixth exemplary embodiment of the present disclosure.

FIG. 22 shows a schematic partial view of a workpiece unit according to a seventh exemplary embodiment of the present disclosure.

FIG. 23 shows a schematic partial plan view of a workpiece unit according to the seventh exemplary embodiment of the present disclosure.

FIG. 24 shows a schematic plan view of a workpiece unit according to the fifth exemplary embodiment of the present disclosure.

FIG. 25 shows a schematic sectional view of a workpiece unit on XXIV-XXIV line in FIG. 24.

FIG. 26 shows a schematic plan view of a workpiece body, showing an example of plane shape of divided sections.

FIG. 27 shows a schematic plan view of a workpiece body, showing an example of plane shape of divided sections.

FIG. 28 shows a schematic plan view of a workpiece body, showing an example of plane shape of divided sections.

FIG. 29 shows a schematic plan view of a workpiece body, showing an example of plane shape of divided sections.

FIG. 30 shows a schematic plan view of a workpiece body, showing another mode of a workpiece body according to the fifth exemplary embodiment of the present disclosure.

FIG. 31 shows a schematic side view of a workpiece body, showing another mode of a workpiece body according to the fifth exemplary embodiment of the present disclosure.

FIG. 32 shows a schematic plan view of a workpiece unit according to the sixth exemplary embodiment of the present disclosure.

FIG. 33 shows a schematic plan view of a section unit according to the sixth exemplary embodiment of the present disclosure.

FIG. 34 shows a schematic plan view of a section unit in another mode different from a mode shown in FIG. 33.

FIG. 35 shows a schematic plan view of a workpiece unit according to the seventh exemplary embodiment of the present disclosure.

FIG. 36 shows a schematic plan view of a dummy workpiece body according to the seventh exemplary embodiment of the present disclosure.

FIG. 37 shows a schematic plan view of a workpiece unit according to the seventh exemplary embodiment of the present disclosure.

DESCRIPTION OF EXEMPLARY EMBODIMENTS

In the explanation below, reference symbols are attached for understanding the present invention, but not for limitation to modes shown in the drawings. In each of the exemplary embodiments, the same symbols are attached to the same elements. It is not intended that size and ratio in size in the drawings are limited to the modes shown in the drawings.

Preferable modes of each of the above aspects are described below.

According to a preferable mode of the first aspect, a first positioning portion has a concave or convex shape. A second positioning portion has a shape which is fitted or engaged with the first positioning portion. At least one part of either of the first positioning portion or the second positioning portion is fitted or engaged with at least one part of the other one.

According to a preferable mode of the first aspect, either of the first positioning portion or the second positioning portion has a concave shape and the other one has a convex shape. The convex shape has a width equivalent or more to that of the concave shape. A part of the convex shape is inserted into the concave shape.

According to a preferable mode of the first aspect, the first positioning portion is arranged over an entire circumference of the workpiece body.

According to a preferable mode of the first aspect, the first positioning portion or the second positioning portion has a groove shape.

According to a preferable mode of the first aspect, the first positioning portion or the second positioning portion has a conical or columnar shape.

According to a preferable mode of the first aspect, the workpiece body comprises a projecting portion projecting from the circumferential portion. The first positioning portion is arranged on the projecting portion. The holding member is arranged in at least projection direction of the projecting portion.

According to a preferable mode of the first aspect, the projecting portion is arranged along the circumferential portion of the workpiece body in a successive manner. The holding member has a ring shape.

According to a preferable mode of the first aspect, the workpiece body comprises a first surface and a second surface arranged on a side opposite to the first surface. The circumferential portion is arranged between the first surface and the second surface. The projecting portion comprises a third surface directed in the same direction as the first surface, a fourth surface directed in the same direction as the second surface, and a fifth surface connecting the third surface and the fourth surface. The holding member covers at least one part of the fifth surface.

According to a preferable mode of the first aspect, the holding member comprises a first surface directed in the same direction as the third surface of the projecting portion and a second surface directed in the same direction as the fourth surface of the projecting portion.

According to a preferable mode of the first aspect, the first surface of the holding member forms a same plane with the third surface of the projecting portion, or is present on a side closer to the first surface of the workpiece body than the third surface of the projecting portion.

According to a preferable mode of the first aspect, the second surface of the holding member forms a same plane with the fourth surface of the projecting portion or is present on a side closer to the second surface of the workpiece body than the fourth surface of the projecting portion.

According to a preferable mode of the first aspect, the holding member further covers at least one part of the third surface and the fourth surface of the projecting portion.

According to a preferable mode of the first aspect, the projecting portion has a thickness approximately equivalent to that of the holding member.

According to a preferable mode of the first aspect, the projecting portion has a width of 0.3 mm to 2 mm in a projection direction.

According to a preferable mode of the first aspect, the projecting portion is arranged at the central area of the workpiece body in a thickness direction.

According to a preferable mode of the first aspect, the workpiece body is formed by machining the workpiece body, and comprises a machined item connected to the projecting portion or an outer edge portion of the workpiece body.

According to a preferable mode of the first aspect, the holding member is formed of 2 or more parts.

According to a preferable mode of the first aspect, each of the parts of the holding member respectively comprises a concave portion or a convex portion. Each of the parts is arranged so that the concave portion and the convex portion are engaged each other.

According to a preferable mode of the first aspect, the workpiece body is ceramic, metal or resin.

According to a preferable mode of the first aspect, the workpiece body is semi-sintered body in which zirconia crystal grains are not completely sintered.

According to a preferable mode of the first aspect, the holding member is jointed onto the workpiece body with adhesive material.

According to a preferable mode of the first aspect, the holding member directly contacts to the workpiece body.

According to a preferable mode of the first aspect, the holding member is made of plastic.

According to a preferable mode of the second aspect, a first positioning portion is a concave or convex portion. In the step of attaching the holding member, the first positioning portion and the second positioning portion are fitted each other.

According to a preferable mode of the second aspect, the step of attaching the holding member comprises: a step of heating the holding member having a ring shape so as to allow expansion, a step of inserting the workpiece body into a ring of the holding member, and a step of cooling the holding member for shrinking.

According to a preferable mode of the second aspect, in the step of expansion of the holding member, the holding member is heated at 60° C. to 150° C.

According to a preferable mode of the second aspect, the workpiece body comprises a projecting portion projecting from the circumferential portion. The first positioning portion is arranged on the projecting portion.

According to a preferable mode of the second aspect, the holding member comprises engineering plastic.

A workpiece unit according to a first exemplary embodiment of a present disclosure will be explained. FIG. 1 shows a schematic plan view of a workpiece unit. FIG. 2 shows a schematic sectional view of the workpiece unit on II-II line in FIG. 1. FIG. 3 shows a schematic partial view of a holding member portion. FIG. 4 shows a schematic sectional view in which the workpiece body and the holding member are exploded.

The workpiece unit 10 comprises a workpiece body 1, and a holding member 2 arranged on at least one part of sidewall of the workpiece body 1. The workpiece body 1 is, for example, a substance which is machined by a machining apparatus. For example, in a case of dental art field, a dental product is produced from the workpiece body 1. As the dental product, for example, a prosthetic material, such as ceramic frame, full contour crown and the like, is exemplified. It is preferable that dental prosthetic material has a tooth crown shape. In addition, as the dental product, for example, an orthodontic product (for example, orthodontic bracket) and a dental implant product (for example, dental implant abutment) are exemplified. The holding member 2 assists holding or fixation of the workpiece unit 10 onto the machining apparatus. For example, when the workpiece unit is held or fixed onto the machining apparatus, at least the holding member 2 in the workpiece unit 10 is held by the machining apparatus.

The workpiece body 1 comprises a first surface 1a, a second surface 1b on a side opposite to the first surface 1a, and a circumferential portion 1c arranged between the first surface 1a and the second surface 1b. It is preferable that the first surface 1a and the second surface 1b are parallel, or approximately parallel. It is preferable that the workpiece body 1 has a flat plate shape. Although the workpiece unit 10 and the workpiece body 1 has a circular plane shape in a mode shown in FIG. 1, it is not limited to the circular shape. It may have a plane shape, such as an elliptic and polygonal shape.

The holding member 2 is arranged on at least one part of the circumferential portion 1c corresponding to a side surface of the workpiece body 1. The holding member 2 directly covers at least one part of the circumferential portion 1c on the workpiece body 1. It is preferable that the holding member 2 is arranged along the circumferential portion 1c in a successive manner. It is preferable that the holding member 2 has a shape according (or adapted) to a plane shape of the workpiece body 1. The holding member 2 may have, for example, a circular, annular, tubular, or ring shape. It is preferable that the holding member 2 arranged over an entire circumference of a sidewall of the workpiece body 1. A gap (or gaps) may be present between the holding member 2 and the workpiece body 1.

In the first exemplary embodiment, the holding member 2 is attached to the workpiece body 1 without any intermediate adhesive material. An inner circumference portion 2c of the holding member 2 and the outer circumferential portion 1c of the workpiece body 1 directly contact each other on at least one part.

The holding member 2 may comprise a first surface 2a directed in the same direction as the first surface 1a of the workpiece body 1, a second surface 2b directed in the same direction as the second surface 1b of the workpiece body 1, and the inner circumference portion 2c which is arranged between the first surface 2a and the second surface 2b and is directed to the circumferential portion 1c of the workpiece body 1. It is preferable that the first surface 2a of the holding member 2 and the first surface 1a of the workpiece body 1 are parallel or approximately parallel. It is preferable that the second surface 2b of the holding member 2 and the second surface 1b of the workpiece body 1 are parallel or approximately parallel. The first surface 2a of the holding member 2 may be present on a side closer to the second surface 1b of the workpiece body 1 than the first surface 1a of the workpiece body 1. Similarly, the second surface 2b of the holding member 2 may be present on a side closer to the first surface 1a of the workpiece body 1b than the second surface 1b of the workpiece body 1. That is, it is preferable that the first surface 1a of the workpiece body 1 and the first surface 2a of the holding member 2 form a step. It is preferable that the second surface 1b of the workpiece body 1 and the second surface 2b of the holding member 2 form a step. It is preferable that the holding member 2 has a thickness t2 thinner than an entire thickness t1 of the workpiece body 1. Thereby, in a case where the workpiece unit 10 is fixed onto the machining apparatus, position adjustment may be carried out easily.

It is preferable that the holding member 2 is arranged at the central area of the workpiece body 1 in a thickness direction of the workpiece body 1. That is, it is preferable that the center of the holding member 2 in the thickness direction overlaps with the center of the workpiece body 1 in thickness direction. Thereby, in a case where the workpiece unit 10 is set on the machining apparatus, position adjustment may be carried out easily.

It is preferable that the workpiece unit 10 is symmetric with respect to an extending direction of the first surface 1a and second surface 1b of the workpiece body 1. For example, it is preferable that either of the first surface 1a and the second surface 1b of the workpiece body 1 may be set on the machining apparatus in a manner directed to a machining tool (usually upper side).

The workpiece body 1 comprises at least one first positioning portion 1d at a part facing the holding member 2 in the circumferential portion 1c. The holding member 2 comprises at least one second positioning portion 2d at a part facing workpiece body 1 in the inner circumference portion 2c. The first positioning portion 1d and the second positioning portion 2d are portions for defining position of the holding member 2 relative to the workpiece body 1. The first positioning portion 1d and the second positioning portion 2d may provide and suppress displacement (or shifting) of the holding member 2 relative to the workpiece body 1.

The first positioning portion 1d and the second positioning portion 2d may be arranged at mutually associated positions. The first positioning portion 1d and the second positioning portion 2d may have mutually associated shapes. For example, it is preferable that the first positioning portion 1d and the second positioning portion 2d have positions and shapes where at least one part of either one is engaged, particularly fitted, with the other one. In modes shown in FIG. 2 to FIG. 4, the first positioning portion 1d is formed as a concave portion. The second positioning portion 2d is formed as a convex portion which fits with the concave portion of the first positioning portion 1d. Positions of the first positioning portion 1d and the second positioning portion 2d may be anywhere, if the circumferential portion 1c of the workpiece body 1 and the inner circumference portion 2c of the holding member 2 are opposing to each other.

It is preferable that at least one part on a tip of the convex portion may be inserted into the concave portion. It is preferable that the convex portion has a shape and size so as to contact to an opening and/or an inner wall of the concave portion. For example, it is preferable that a width of the convex portion (for example, a size in a direction (vertical direction in the figure) connecting the first surface 1a and the second surface 1b of the workpiece body 1) is larger than a width (a size in vertical direction) of the concave portion. Thereby, displacement of the holding member 2 relative to the workpiece body 1 may be suppressed by fitting or engagement of the first positioning portion 1d and the second positioning portion 2d.

FIG. 5 to FIG. 8 show schematic plan views of examples of the first positioning portion 1d and the second positioning portion 2d. Although plan views of the first positioning portion 1d are shown in FIG. 5 to FIG. 8, the second positioning portion 2d also has a plane shape associated with a shape of the first positioning portion 1d. Illustration and explanation of the second positioning portion 2d are omitted. The first positioning portion 1d may be formed as, for example, a successive groove portion as shown in FIG. 5 and FIG. 6. The first positioning portion 1d may be a straight groove portion as shown in FIG. 5 and a groove portion having a zigzag or meandering shape as shown in FIG. 6. The first positioning portion 1d may be formed as at least one partial or separated dot concave part (for example, conical or columnar shape) as shown in, for example, FIG. 7 and FIG. 8. A dotted line formed of the first positioning portions 1d may be straight as shown in FIG. 7 or a zigzag or meandering shape as shown in FIG. 8. Although first positioning portions 1d having regular shapes is shown in FIG. 5 to FIG. 8, the first positioning portion 1d may have an irregular shape.

Although the first positioning portion 1d and the second positioning portion 2d have cross-sectional planes having one triangular shape in the modes shown in FIG. 2 to FIG. 4, the first positioning portion 1d and the second positioning portion 2d may have different cross-sectional shapes. FIG. 9 to FIG. 12 show schematic partial views of examples of the first positioning portion 1d and the second positioning portion 2d. For example, the first positioning portion 1d and the second positioning portion 2d may have a polygonal cross-sectional plane, such as a square cross-sectional plane, as shown in FIG. 9. The first positioning portion 1d may have a cross-sectional shape (hemispherical shape), such as a half circular or half elliptical shape, as shown in FIG. 10. In contrast, the second positioning portion 2d may have a cross-sectional shape (hemispherical shape), such as a half circular or half elliptical shape, similar to that of the first positioning portion 1d, and also have a shape different from that of the first positioning portion 1d as shown in FIG. 10 (a triangular shape in FIG. 10). A part of the second positioning portion 2d may be engaged with the first positioning portion 1d as shown in FIG. 11. In a mode shown in FIG. 11, the second positioning portion 2d has a width w22 equivalent or more to a width w21 of the first positioning portion 1d. A part of the second positioning portion 2d is inserted into the first positioning portion 1d, and the first positioning portion 1d and the second positioning portion 2d partially contact to each other on upper and lower edges of the first positioning portion 1d. In such case, it is unnecessary that the circumferential portion 1c of the workpiece body 1 and the inner circumference portion 2c of the holding member 2 contact to each other. Or as shown in FIG. 11, the holding member 2 may, for example, deform by its shrinkage so as to partially contact to the circumferential portion 1c of the workpiece body 1 on upper and lower edges of the inner circumference portion 2c. In addition, as shown in FIG. 12, the first positioning portion 1d and the second positioning portion 2d may comprise a plurality of concave portions or convex portions in one cross-sectional plane.

It is preferable that the first positioning portion 1d and/or the second positioning portion 2d have a depth and/or height at which the first positioning portion 1d and the second positioning portion 2d may be engaged. The first positioning portion 1d and/or the second positioning portion 2d may have a depth and/or height of, for example, 0.5 mm or more.

The holding member 2 may have any thickness t2, if no trouble is provided in machining of the workpiece body 1 due to such thickness. It is preferable that the holding member 2 has a thickness t2 thinner than a thickness t1 of the workpiece body 1. It is for easy holding of the workpiece unit 10 onto the machining apparatus. It is preferable that the holding member 2 has a thickness t2 of 1 mm or more, preferably 2 mm or more, more preferably 4 mm or more. It is for retaining holding-strength by the machining apparatus.

The holding member 2 may have a width w1 at which the workpiece unit 10 may be held onto the machining apparatus.

As a material of the workpiece body 1, for example, ceramic, metal, resin etc. may be used. An example of the ceramic may be exemplified by material(s) containing at least one of zirconia, alumina and glass ceramics. An example of the metal may be exemplified by titanium, titanium alloy etc. An example of the resin may be exemplified by acryl resin, methacrylate resin, ABS (acrylonitrile buta diene styrene) resin, polycarbonate, polypropylene, polystyrene, polyester, polyether ketone, Teflon (registered trademark) etc. In addition, an example of the resin may be also exemplified by composite material (composite resin) where these resins are filled with inorganic filler.

In a case where, for example, the workpiece body 1 is used for cutting out a dental product, the workpiece body 1 may be semi-sintered zirconia in which zirconia crystal grains are fired, but not to be a completely sintered state. The semi-sintered zirconia contains a stabilizer which suppresses phase transition in zirconia and crystal phase of zirconia. For example, when it is converted into a sintered body, the stabilizer suppresses phase transition in the crystal phase of the sintered body from tetragonal to monoclinic shape. The stabilizer may be exemplified by oxides, such as, for example, calcium oxide (CaO), magnesium oxide (MgO), yttrium oxide (Y2O3), cerium oxide (CeO2) etc. It is preferable that the stabilizer is supplied at an amount at which tetragonal zirconia grains may be partially stabilized. For example, in a case where yttria is used as the stabilizer, content ratio of yttria is preferably 2 mol % to 8 mol %, more preferably 2.5 mol % to 6.5 mol %, relative to total mol of zirconia and yttria. In a case where the content ratio of the stabilizer is excessively increased, phase transition may be suppressed, however, bending strength and fracture toughness would be reduced. On the other hand, in a case of a too small content ratio of the stabilizer, reduction in bending strength and fracture toughness may be suppressed, however, suppression of progress in phase transition would be insufficient. Herein, zirconia which is partially stabilized by addition of the stabilizer is referred to as "partially stabilized zirconia". The content ratio of the stabilizer in the sintered zirconia can be measured by, for example, Inductively Coupled Plasma (IPC) emission spectrometric analysis, X-ray fluorescence analysis and the like.

An entire size dl of the workpiece body 1 and a thickness t1 of the workpiece body 1 may be appropriately designed according to a purpose.

It is preferable that, material of the holding member 2 is a material which is not greatly deformed due to pressure upon fixation when it is fixed onto the machining apparatus. In addition, it is preferable that the material of the holding member 2 is a material which may be attached onto the workpiece body 1 by methods explained below. As the material of the holding member 2, utilized are, for example, engineering plastic, polypropylene, polystyrene, acryl resin, ABS (acrylonitrile buta diene styrene) resin, polycarbonate, polyester, polyether ketone, Teflon (registered trademark), metal, wood etc. In addition, above examples of the resin may also include composite material (composite resin) in which the resin is filled with inorganic filler.

Information may be attached onto the holding member 2. For example, the information may be provided at a visually recognizable position on the holding member 2 by lettering, marking, seal, etc. with symbols, such as letters, a bar code etc. The information may include, for example, a lot number, a color (shade), a shrinkage ratio (loss ratio by shrinkage upon sintering), a discrimination for upper/lower sides, etc.

A producing method of the workpiece unit according to the first exemplary embodiment will be explained.

First, a workpiece body 1 is produced. Partially stabilized zirconia powder as zirconia particles containing a stabilizer is prepared. Type and concentration of the stabilizer may be pertinently selected. A preferable particle diameter and a particle diameter distribution of zirconia crystal grains are pertinently selected. As an adding method of the stabilizer into zirconia particles, a preferable method, such as a hydrolysis method, neutralization coprecipitation method, an alkoxide method, a solid phase method etc., may be selected appropriately. An additive is supplied and mixed with the prepared partially stabilized zirconia powder, if required. In a case of wet blending, a composition is dried.

Next, the composition is formed into a predetermined shape by pressure formation. For example, the composition is pressurized to form a shaped of the workpiece body 1. A preferable method may be appropriately selected as the pressure formation method. A pressurizing pressure may be, for example, 20 MPa or more. After the pressure formation, the composition for sintering may be further subjected to CIP (Cold Isostatic Pressing) at a pressure of 150 MPa or more. After the pressure formation, a formed body (compact) may be machined into a desired shape by cutting, grinding, etc.

Next, the formed body is fired at a temperature at which the zirconia particles are not sintered so as to form a semi-sintered body. A semi-sintering condition may be at a semi-sintering temperature of 800° C. to 1200° C., and for a keeping time of 1 hour to 12 hours. The semi-sintered body may be machined into a desired configuration by cutting, grinding, etc. For example, the semi-sintered body may be formed into a shape of the workpiece body 1 (also a projecting portion is formed) after the semi-sintered body has been produced, instead of formation into a shape of the workpiece body 1 upon shape forming. Thereby, a workpiece body 1 is produced.

Next, a holding member 2 is prepared. Producing method for the holding member 2 is not specifically limited. For example, the holding member 2 may be produced by injection molding, extrusion molding, cutting machining (cutting out formation), etc. In a case of a holding member 2 having a ring shape, for example, the holding member 2 is heated to be expanded. Heating temperature for the holding member 2 may be appropriately set according to the material of the holding member 2. For example, in a case where the holding member 2 is engineering plastic, the heating temperature for the holding member 2 is preferably 60° C. or more, more preferably 80° C. or more. In addition, the heating temperature for the holding member 2 is preferably 150° C. or less, and may be, for example, 120° C. or less, or 100° C. or less. Next, under a state where the holding member 2 is expanded, the workpiece body 1 is fitted into the holding member 2 so that a first positioning portion 1d of the workpiece body 1 and a second positioning portion 2d are fitted together. In addition, positioning of the holding member 2 and the workpiece body 1 is performed and then the holding member 2 is cooled. The holding member 2 shrinks due to cooling. Thereby, the holding member 2 is attached onto the workpiece body 1 (so-called shrink fitting method). According to this method, the holding member 2 may be attached onto the workpiece body 1 without using any adhesive material.

FIG. 13 and FIG. 14 show a schematic cross-sectional view of an example of a workpiece unit after machining of a workpiece body 1. FIG. 14 is a schematic partial view of a part of the first positioning portion 1d and the second positioning portion 2d. The workpiece unit 10 is set on a machining apparatus, and the workpiece body 1 is machined by cutting out and the like to form a machined item 4. The machined item 4 may be cut out into a connected state to an outer edge portion 1e while the outer edge portion 1e of the workpiece body is allowed to remain in a frame-shape. The machined item 4 is, for example, a dental product as described above. Due to formation of the machined item 4, a cut-off part 5 which has been cut off is formed on the workpiece body 1. The outer edge portion 1e is formed along a circumferential portion 1c due to formation of the machined item 4 and the cut-off part 5. The outer edge portion 1e is a machining margin which acts as a frame of the machined item 4. The machined item 4 is connected to the outer edge portion 1e via a connecting part 4a. It is preferable that the first positioning portion 1d has a shape which provides no negative effects, such as dropping off of the machined item 4, after machining.

According to the first exemplary embodiment, the holding member 2 may be attached onto the workpiece body 1 at a pertinent position by engaging the first positioning portion 1d and the second positioning portion 2d. In addition, even after attachment of the holding member 2 onto the workpiece body 1, the first positioning portion 1d and the second positioning portion 2d play a role as a stopper against slipping, resulting in that displacement (position shifting) of the holding member 2 relative to the workpiece body 1 may be suppressed.

In the first exemplary embodiment, no adhesive material is used for attachment of the holding member 2. Therefore, even in a case of being subjected to a high temperature after machining, damage onto the workpiece body 1 may be suppressed, the damage being caused through stress applied to the workpiece body 1 by the holding member 2 due to difference between a heat expansion coefficient of the workpiece body 1 and a heat expansion coefficient of the holding member 2. In addition, in a case where it is desired that the holding member 2 is detached from the workpiece body 1 after machining, the holding member 2 may be easily detached.

In addition, the holding part to be held by the machining apparatus is not formed by the workpiece body 1 itself, instead the holding member 2 replaces the role of the holding part, and thus a mold for producing the workpiece body 1 may be downsized by a width of the holding member 2. Therefore, consumption amount of low material for the workpiece body 1 can be reduced. In a case where cost for the workpiece body 1 is higher than that of the holding member 2, production cost for the workpiece unit 10 and the machined item 4 can be reduced.

A workpiece unit according to a second exemplary embodiment of the present disclosure will be explained. FIG. 15 shows a schematic partial view of a workpiece unit according to the second exemplary embodiment.

In addition to the configuration of the first exemplary embodiment, a workpiece unit 20 further comprises adhesive material 3 for jointing a workpiece body 1 and a holding member 2. That is, the workpiece body 1 and the holding member 2 are jointed with the adhesive material 3 on at least a part. It is preferable that the adhesive material 3 is arranged in a region where the workpiece body 1 and the holding member 2 face each other. It is preferable that material of the adhesive material 3 is a material which provides no displacement between the workpiece body 1 and the holding member 2. As the adhesive material 3, for example, thermosetting resin, photosetting resin and the like may be used.

A producing method of the workpiece unit 20 may be the same as that of the producing method of the first exemplary embodiment, with the proviso that the workpiece body 1 and the holding member 2 may be jointed with the adhesive material 3 in the second exemplary embodiment. Therefore, in a case of using a holding member which cannot be applied to the shrink fitting method, the second exemplary embodiment may be preferably applied.

The other modes (details) in the second exemplary embodiment other than those described above may be the same as those in the first exemplary embodiment. The adhesive material may be applied to each mode shown in the first exemplary embodiment. The second exemplary embodiment may be combined with at least one mode above, if possible.

The second exemplary embodiment can also exert positioning effect and displacement prevention effect like as the first exemplary embodiment. According to the second exemplary embodiment, attachment strength of holding member 2 onto the workpiece body 1 may be enhanced.

A workpiece unit according to a third exemplary embodiment of the present disclosure will be explained. FIG. 16 shows a schematic partial view of the workpiece unit according to the third exemplary embodiment.

In the first and second exemplary embodiments, the first positioning portion of the workpiece body is a concave portion and the second positioning portion of the holding member is a convex portion. In the third exemplary embodiment, a concave portion and a convex portion are inversely positioned between the workpiece body 1 and the holding member 2. That is, a first positioning portion 1f disposed on the circumferential portion 1c of the workpiece body 1 is a convex portion. A second positioning portion 2f disposed on the inner circumference portion 2c of the holding member 2 is a concave portion associated with the first positioning portion 1f.

A producing method of the workpiece unit 30 may be the same as that of the producing method of the first exemplary embodiment.

The other modes (details) in the third exemplary embodiment other than those described above may be the same as those in the first exemplary embodiment. The third exemplary embodiment may be combined with at least one mode above, if possible.

In the third exemplary embodiment, the workpiece body 1 and the holding member 2 may be jointed with the adhesive material (figures are omitted) like as the second exemplary embodiment.

The third exemplary embodiment may exert effects similar with those of the first exemplary embodiment.

A workpiece unit according to a fourth exemplary embodiment of the present disclosure will be explained. FIG. 17 shows a schematic plan view of a workpiece unit. FIG. 18 shows a schematic cross-sectional view of the workpiece unit taken along XVII-XVII line in FIG. 17. FIG. 19 shows a schematic partial view of a holding member portion.

In the fourth exemplary embodiment, a workpiece body 41 further comprises a projecting portion 41c in addition to the configuration of the first exemplary embodiment. The holding member 2 is disposed on at least one part of the projecting portion 41c. A first positioning portion 41h is disposed on the projecting portion 41c.

The workpiece body 41 comprises a first surface 41a dedicated to be a machining target surface and a second surface 41b on a side opposite to the first surface 41a. It is preferable that the first surface 41a and the second surface 41b are parallel or approximately parallel. It is preferable that the workpiece body 41 has a flat plate shape. Although the workpiece unit 40 and the workpiece body 41 have a circular plane shape in a mode shown in FIG. 17, the shape is not limited to circle, thus they may have a plane shape, such as an ellipse, a polygon, etc.

The workpiece body 41 comprises a projecting portion 41c along at least one part of a sidewall, that is on an outer edge of the first surface 41a and the second surface 41b or on a circumferential portion 41g between the first surface 41a and the second surface 41b. It is preferable that the projecting portion 41c is a portion for holding the workpiece unit 40 onto the machining apparatus. It is preferable that the projecting portion 41c is disposed on a region which is not machined by the machining apparatus. It is preferable that the projecting portion 41c is arranged over an entire circumference of the circumferential portion 41g on the workpiece body 41 in a successive manner. That is, it is preferable that projecting portion 41c has a ring shape or an annular shape. The projecting portion 41c may have a shape such that it projects from a side surface of the workpiece body 41. For example, the projecting portion 41c projects (from an area) between the first surface 41a and the second surface 41b of the workpiece body 41 in an approximately vertical [sic, parallel] direction relatively to the first surface 41a and the second surface 41b. In addition, the projecting portion 41c is arranged on the circumferential portion 41g of the workpiece body 41 and has such a shape that an end part of the workpiece body 41 is thinner than the other part.

The projecting portion 41c may comprise a third surface 41d directed in the same direction as the first surface 41a and a fourth surface 41e directed in the same direction as the second surface 41b. The projecting portion 41c may comprise a fifth surface 41f connecting the third surface 41d and the fourth surface 41e. It is preferable that the third surface 41d and the fourth surface 41e are parallel or approximately parallel. It is preferable that the third surface 41d and the first surface 41a are parallel or approximately parallel. It is preferable that the fourth surface 41e and the second surface 41b are parallel or approximately parallel. It is preferable that the third surface 41d and the fifth surface 41f are vertical or approximately vertical one another. It is preferable that the fourth surface 41e and the fifth surface 41f are vertical or approximately vertical. It is preferable that the first surface 41a and the second surface 41b are vertical or approximately vertical to the fifth surface 41f. It is preferable that a thickness t12 of the projecting portion 41c is thinner than an entire thickness t11 of the workpiece body 41. That is, it is preferable that the first surface 41a and the third surface 41d form a step. It is preferable that the second surface 41b and the fourth surface 41e form a step. Thereby, in a case where the workpiece unit 40 is fixed onto the machining apparatus, positioning may be easily carried out. Herein, the first surface 41a and the third surface 41d may form the same plane. In addition, the second surface 41b and the fourth surface 41e may form the same plane.

A thickness t12 of the projecting portion 41c is preferably 1 mm or more, more preferably 2 mm or more, further preferably 4 mm or more. It is for holding of the workpiece unit 40 upon machining and reinforcement of the machined workpiece body 41.

A width w11 of the projecting portion 41c is preferably 2 mm or less, more preferably 1.7 mm or less, and further preferably 1.5 mm or less. It is because that too large width w11 of the projecting portion 41 results in enlargement of useless parts in the workpiece body 41. In addition, the width w11 of the projecting portion 41c is preferably 0.3 mm or more, preferably 0.4 mm or more, more preferably 0.6 mm or more, further preferably 0.8 mm or more. The projecting portion 41c has an effect for reinforcement of the machined workpiece body 41. Therefore, in order to reinforce the machined workpiece body 41, a constant width is required for the projecting portion 41c.

It is preferable that the projecting portion 41c is arranged in the central area of the workpiece body 41 in a thickness direction of the workpiece body 41. That is, it is preferable that the central area of the projecting portion 41c in a thickness direction overlaps with the center of the workpiece body 41 in a thickness direction. Thereby, in a case where the workpiece unit 40 is set on the machining apparatus, positioning adjustment may be easily carried out.

An entire size d12 of the workpiece body 41 and a size d13 of the first surface 41a and the second surface 41b dedicated to be a machining target surface of the workpiece body 41 may be appropriately designed according to a purpose.

The holding member 2 is arranged on at least one part of outside of the projecting portion 41c. It is preferable that the holding member 2 is arranged in at least a projection direction of the projecting portion 41c. It is preferable that the holding member 2 is arranged along the fifth surface 41f corresponding to a side surface of the projecting portion 41c in a successive manner. That is, the holding member 2 may cover at least one part of the fifth surface 41f of the projecting portion 41c. The fifth surface 41f of the projecting portion 41c faces the inner circumference portion 2c of the holding member 2. In a case of no interposed adhesive material, the fifth surface 41f of the projecting portion 41c and the inner circumference portion 2c of the holding member 2 directly contact each other at least partially. It is preferable that the first surface 2a of the holding member 2 and the third surface 41d of the workpiece body 41 are parallel or approximately parallel. It is preferable that the second surface 2b of the holding member 2 and the fourth surface 41e of the workpiece body 41 are parallel or approximately parallel.

The third surface 41d of the projecting portion 41c and the first surface 2a of the holding member 2 may form the same plane. Similarly, the fourth surface 41e of the projecting portion 41c and the second surface 2b of the holding member 2 may form the same plane. It is aimed at complete overlapping of the holding member 2 and the projecting portion 41c. In such case, a thickness t13 of the holding member 2 is the same with a thickness t12 of the projecting portion 41c. Alternatively, the first surface 2a of the holding member 2 may be present on a side closer to the first surface 41a of the workpiece body 41 than the third surface 41d of the projecting portion 41c. Similarly, the second surface 2b of the holding member 2 may be present on a side closer to the second surface 41b of the workpiece body 41 than the fourth surface 41e of the projecting portion 41c. It is aimed at easy holding of the workpiece unit 40 onto the machining apparatus. In such case, a thickness t13 of the holding member 2 is thicker than a thickness t12 of the projecting portion 41*c*.

The thickness t13 of the holding member 2 may be any thickness if no problem is provided in machining of the workpiece body 41. A thickness t13 of the holding member 2 is preferably thinner than a thickness t1 of the workpiece body 41, more preferably equivalent to a thickness t12 of the projecting portion 41*c*. It is aimed at easy holding of the workpiece unit onto the machining apparatus. The thickness t13 of the holding member 2 is preferably 1 mm or more, more preferably 2 mm or more, further preferably 4 mm or more. It is for maintaining of holding strength by the machining apparatus.

It is preferable that the machining apparatus holds a part where the projecting portion 41*c* and the holding member 2 are combined. Therefore, it is preferable that a width w12 of the holding member 2 is a width at which it may be held by the machining apparatus together in combination with a width w11 of the projecting portion 41*c*.

The first positioning portion 41*h* of the workpiece body 41 may be arranged on the fifth surface 41*f* of the projecting portion 41*c*. The second positioning portion 2*d* of the holding member 2 may be arranged at a position associated with the first positioning portion 41*h*. Shapes of the first positioning portion 41*h* and the second positioning portion 2*d* may be the same as those in the first exemplary embodiment.

A producing method of the workpiece unit 40 may be the same as that of the producing method of the first exemplary embodiment.

The shape of the projecting portion and the holding member may be different from those shown in FIG. 17 to FIG. 19. FIG. 20 to FIG. 23 show other examples of the projecting portion and the holding member.

In the workpiece unit 50 shown in FIG. 20, the holding member 52 may be arranged so as to cover not only the fifth surface 41*f* of the projecting portion 41*c*, but also at least one part of third surface 41*d* and the fourth surface 41*e*. That is, the holding member 52 may comprise a groove portion receiving the projecting portion 41*c* at the side of the workpiece body 41. The holding member 52 may be arranged so that the projecting portion 41*c* fits to (in or on) the groove portion. Modes (details) of the first positioning portion 41*h* and the second positioning portion 52*a* may be the same as those described above.

It is preferable that a width w14 of the projecting portion 41*c* is the same with a width w11 shown in FIG. 18. It is preferable that a width (w14+w15) of the holding member 52 is the same with a width (w11+w12) shown in FIG. 18. It is preferable that a thickness t14 of the projecting portion 41*c* is 1 mm or more in order to ensure strength. It is preferable that a thickness t15 of the holding member 52 is equivalent or less than that of the workpiece body 41 in order to be held on the machining apparatus.

In the workpiece unit 60 shown in FIG. 21, the holding member 62 may be arranged so as to cover the fifth surface 41*f* and one of the third surface 41*d* and the fourth surface 41*e*, of the projecting portion 41*c*. In a mode shown in FIG. 21, the holding member 62 is arranged so as to cover the third surface 41*d* and the fifth surface 41*f* of the projecting portion 41*c*.

The holding member 62 comprises a first surface 62*a* directed in the same direction as the second surface 41*b* and the fourth surface 41*e* of the workpiece body 41. It is preferable that in the holding member 62, the first surface 62*a* forms a same plane as the fourth surface 41*e* of the projecting portion 41*c*, or is arranged so as to be present on a side closer to the second surface 41*b* than the fourth surface 41*e* of the projecting portion 41*c*. It is aimed at stabilization in attachment of the workpiece unit 60 onto the machining apparatus. Modes of the first positioning portion 41*h* and the second positioning portion 62*b* may be the same as those described above. It is preferable that the holding member 62 is arranged at a central area in a thickness direction of the workpiece body 41. In such case, the position of the projecting portion 41*c* may be displaced from the center in a thickness direction of the workpiece body 41.

It is preferable that a width w16 of the projecting portion 41*c* is equivalent to a width w11 shown in FIG. 18. It is preferable that a width (w16+w17) of the holding member 52 is equivalent to a width (w1+w2) shown in FIG. 18. It is preferable that a thickness t16 of the projecting portion 41*c* is 1 mm or more in order to ensure strength. It is preferable that a thickness t17 of the holding member 62 is equivalent to or less than that of the workpiece body 41 in order to be held on the machining apparatus.

In the workpiece units 70 shown in FIG. 22 and FIG. 23, the holding member 72 comprises 2 or more components (parts). FIG. 23 shows a plan view of the holding member 72 seen from a side of the side surface. In modes shown in FIG. 22 and FIG. 23, the holding member 72 comprises a first part 72*a* covering the third surface 41*d* of the projecting portion 41*c* and a second part 72*b* covering the fourth surface 41*e* of the projecting portion 41*c*. The fifth surface 41*f* of the projecting portion 41*c* is covered by the first part 72*a* and the second part 72*b*. The first part 72*a* and the second part 72*b* respectively comprise at least one engaging portion at a side directed to the fifth surface 41*f* of the projecting portion 41*c*. For example, the first part 72*a* and the second part 72*b* are arranged on the side directed to the fifth surface 41*f* of the projecting portion 41*c* so that a concave portion and a convex portion fit each other. In a mode shown in FIG. 23, a boundary between the first part 72*a* and the second part 72*b* has a meandering shape. Modes of the first positioning portion 41*h* and the second positioning portion 72*c* may be the same as those described above.

It is preferable that in the first part 72*a* and the second part 72*b*, regions where the concave portion and the convex portion are formed have the same shape. It is preferable that the first part 72*a* and the second part 72*b* have the same shape as a whole. It is more preferable that the first part 72*a* and the second part 72*b* are the same components. In such case, production and management of the holding member 72 may be simplified.

According to modes shown in FIG. 22 and FIG. 23, each part of the holding member 72 may be prevented from displacement by arranging an engaging portion on each part. By virtue that the holding member 72 comprises a plurality of parts, attachment of the holding member 72 onto the workpiece body 41 may be easily carried out.

The other modes in the fourth exemplary embodiment other than those described above may be the same as those in the first exemplary embodiment. The fourth exemplary embodiment may be combined with at least one mode mentioned above, if possible.

In the fourth exemplary embodiment, the workpiece body and the holding member may be jointed with the adhesive material (figures are omitted) like as the second exemplary embodiment.

Each mode in the fourth exemplary embodiment shows a mode where the first positioning portion of the workpiece body is a concave portion and the second positioning portion of the holding member is a convex portion. In each mode of the fourth exemplary embodiment, the concave portion and the convex portion may be inversely positioned between the workpiece body and the holding member like as the third exemplary embodiment. That is, the first positioning portion arranged on the projecting portion of the workpiece body may be defined as a convex portion, and the second positioning portion arranged on the inner circumference portion of the holding member may be defined as a concave portion (figures are omitted).

Although each mode of the fourth exemplary embodiment shows a mode where the first positioning portion 41$h$ of the workpiece body 41 is present on the fifth surface 41$f$ of the projecting portion 41$c$, the first positioning portion 41$h$ may be arranged on at least one of the third surface 41$d$ and the fourth surface 41$e$ of the projecting portion 41$c$. The second positioning portion may be arranged at a position associated with the first positioning portion.

The fourth exemplary embodiment may exert the same effect as that of the first exemplary embodiment.

Although the shape of the machined workpiece body 41 is the same with those in FIG. 13 and FIG. 14, the machined workpiece body 41 further comprises a projecting portion 41$c$ on an outer edge portion 1$e$. The machined item 4 is connected to at least one of the outer edge portion 1$e$ and the projecting portion 41$c$. After machining, as shown in FIG. 13 and FIG. 14, even in a case where the outer edge portion of the workpiece body 41 has a thin width and thus sufficient strength is not provided by the outer edge portion only, the outer edge portion of the workpiece body 41 may be reinforced by the projecting portion 41$c$ according to the workpiece unit 40 of the present disclosure. That is, the thickness of the outer edge portion of the workpiece body 41 may be partially secured by the projecting portion 41$c$. Thereby, even in a case where the workpiece body 41 is subjected to an impact after machining, damage on the workpiece body 41 may be suppressed. In addition, by virtue of arranging the projecting portion 41$c$, allowable tolerance range for positioning deviation upon attaching the workpiece unit 40 onto the machining apparatus may be increased.

A workpiece unit according to a fifth exemplary embodiment of the present disclosure will be explained. In the fifth exemplary embodiment, a workpiece body comprises a plurality of components. FIG. 24 shows a schematic plan view of a workpiece unit according to the fifth exemplary embodiment. FIG. 25 shows a schematic cross-sectional view of the workpiece unit on XXIV-XXIV line in FIG. 24.

In the workpiece unit 140, a workpiece body 141 is physically divided into a plurality of divided sections 142. One workpiece body 141 is configured by assembling the plurality of divided sections 142. At least two divided sections 142 among the plurality of divided sections 142 may respectively have a different composition. For example, each divided sections 142 may respectively contain a different coloring material. At least two divided sections 142 among the plurality of divided sections 142 may have the same composition, and all of the divided sections 142 may have the same composition. Main material of each divided section 142 may be the same or different. It is preferable that one divided section 142 has a size smaller than that capable of being held or fixed onto the machining apparatus.

At least one of the plurality of divided sections 142 may be a part to be machined by the machining apparatus. At least one of the plurality of divided sections 142 may be a part not to be machined by the machining apparatus. At least one of the plurality of divided sections 142 may be a dummy workpiece body for supplementing the size (filling a gap) of the workpiece body 141 so that the workpiece body 141 has a size capable of being held by the machining apparatus.

It is preferable that the workpiece body 141 is divided into each of the divided sections 142 in a manner such that a first surface 141$a$ and a second surface 141$b$ of the workpiece body 141 are divided. The number of the divided sections 142 per one workpiece body 141 may be appropriately set. The size of one divided section 142 may be appropriately adjusted according to needs and the like, such as each composition, etc. The plurality of divided sections 142 may be different or the same in size respectively.

At least one divided section 142 may comprise at least one part of the first positioning portion 141$d$ of the workpiece body 141. Modes of the first positioning portion 141$d$ may be the same as those described above. The first positioning portion 141$d$ may be successive by assembling the plurality of divided sections 142.

At least one divided section 142 may comprise at least one part of the projecting portion 141$c$ of the workpiece body 141. Modes of the projecting portion 141$c$ may be the same as those of the exemplary embodiments above mentioned. The projecting portions 141$c$ may be successive by assembling the plurality of divided sections 142.

Each of the divided sections 142 may have any shape. The plurality of divided sections 142 may respectively be different or the same in shape. In a case where the workpiece body 141 has a plane circular shape, it is preferable that the divided sections 142 divide the workpiece body 141 in a manner crossing the center of the circular shape. For example, a divided section 142 may have a plane sector shape. In a case where the divided section 142 has a sector shape, it is preferable that the sector shapes have the same radius. Thereby, the plurality of divided sections 142 may be radially assembled in a manner that their arcs are successive so that a workpiece body 141 having a circular or ellipse shape may be configured. It is preferable that the sum of central angles of the plurality of divided sections 142 is 360°. Each sector shape may have any central angle, for example, 45°, 60°, 90°, 120°, 180° (that is, half circle, half ellipse, etc.) 240°, 270°, 300°, 315° and the like.

It is preferable that the plurality of divided sections 142 respectively has the same thickness. Thereby, both of the first surface 141$a$ and the second surface 141$b$ may be formed in plane respectively. In addition, position adjustment in thickness direction may be easily carried out upon fixation of the workpiece unit 140 onto the machining apparatus.

In the modes shown in FIG. 24 and FIG. 25, the workpiece body 141 comprises a first divided section 142$a$, a second divided section 142 and a third divided section 142$c$. The first divided section 142$a$, the second divided section 142$b$ and the third divided section 142$c$ have the same shape. The first divided section 142$a$, the second divided section 142$b$ and the third divided section 142$c$ have the same size. The first divided section 142$a$, the second divided section 142$b$ and the third divided section 142$c$ have a plane shape in which both surfaces have a sector shape. A central angle of the sector shape is 120°. The first divided section 142$a$, the second divided section 142$b$ and the third divided section 142$c$ are radially arranged so as to form a circular workpiece body 141. Both surfaces of the first divided section 142$a$, the second divided section 142$b$ and the third divided section 142$c$ are respectively arranged on the same plane, and a first surface 141$a$ and a second surface 141$b$ are formed in respective planes.

FIG. 26 to FIG. 29 show a schematic plan view of a workpiece body, showing an example of plane shape of divided sections. FIG. 26 to FIG. 29 show a state where the divided sections forming one workpiece body are separated (i.e. exploded). In a mode shown in FIG. 26, the divided sections 142a, 142b, 142c have a plane sector shape having a central angle of 120°. In a mode shown in FIG. 27, the divided sections 142a, 142b have a plane half circular shape. In a mode shown in FIG. 28, the divided sections 142a have a plane half circular shape, and the divided sections 142b, 142c have plane sector shape having a central angle of 90°. In the modes shown in FIG. 26 to FIG. 28, each divided section has the same radius. In the mode shown in FIG. 29, the divided sections 142a to 142f do not have a plane sector shape, but being configured so as to form a circle when they are assembled.

FIG. 30 shows a schematic plan view of a workpiece body, showing another mode of the workpiece body. Adjacent divided sections 142 may directly contact each other. Or, as shown in FIG. 30, the workpiece body 141 may further comprise cushioning (buffer) material 143 on at least one part between adjacent divided sections 142. It is preferable that the cushioning material 143 is a material capable of smoothing unevenness (depressions and protrusions) on end surfaces of the divided sections 142. The cushioning material 143 may be adhesive material jointing the divided sections 142 each other. For example, a resin sheet may be used as the cushioning material 143. Although FIG. 30 shows a mode where the cushioning material 143 is entirely arranged at gaps between the divided sections 142, the cushioning material 143 may be partially arranged at gaps between the divided sections 142. By virtue of the cushioning material 143, inconsistency upon assembling due to unevenness on end surfaces of the divided sections 142 may be suppressed. In addition, by virtue that the adhesive material is used as the cushioning material 143, joint strength between divided sections 142 may be enhanced.

FIG. 31 shows a schematic side view of the workpiece body, showing another mode of the workpiece body. The divided section 142 may comprise an engaging portion for engagement with an adjacent divided section 142 on an end surface directed to the adjacent divided sections 142. As shown in FIG. 31, the engaging portion may be, for example, a concave portion 142g formed on an end surface of the divided section 142 and a convex portion 142h which is formed on an end surface of the and divided section 142b and fits to the concave portion 142g. In addition to the engaging portion, the workpiece body 141 may further comprise cushioning material 143 as shown in FIG. 30. By virtue of arrangement of the engaging portion, joint strength between the divided sections 142 may be enhanced.

In a case where a divided section 142 is used as a divided section which is not to be machined (a dummy workpiece body), as a material for the divided section which is not to be machined, in addition to those described above, any material is useable that is capable of holding the workpiece unit 140 on the machining apparatus and has a strength capable of machining a divided section 142 to be machined.

The other modes in the fifth exemplary embodiment other than those described above may be the same as those in the first to fourth exemplary embodiments. The fifth exemplary embodiment may be combined with at least one mode mentioned above, if possible.

According to the fifth exemplary embodiment, similar effect may be exerted like as those of the first to fourth exemplary embodiments.

According to the fifth exemplary embodiment, the workpiece body may comprise a plurality of divided sections having different compositions. Size and shape of each divided section may be adjusted, if necessary. Thereby, utilization efficiency of the workpiece body is enhanced, thus waste workpiece bodies may be reduced. In addition, the workpiece body may be sold per unit of one divided section. Furthermore, machined items having different compositions may be produced at one machining process by the machining apparatus.

A workpiece unit according to a sixth exemplary embodiment of the present disclosure will be explained. FIG. 32 shows a schematic plan view of a workpiece unit in the sixth exemplary embodiment. FIG. 33 shows a schematic plan view of a section unit in the sixth exemplary embodiment. In the fifth exemplary embodiment, one holding member is applied to one divided section. In the sixth exemplary embodiment, a part of the holding member is arranged for every divided section.

A workpiece unit 150 according to the sixth exemplary embodiment comprises a plurality of section units 151. Each of the section units 151 comprises a divided section 142, and a cover member 152 arranged on at least one part on a side surface of the divided section 142. The divided section 142 may be the same as the divided section of the fifth exemplary embodiment. Size of one section unit 151 may have a smaller size than that capable of being held on the machining apparatus.

In a mode shown in FIG. 33, a cover member 152 surrounds circumferential portion (side surface) of the divided section 142. The cover member 152 may be the same as the holding members of the first to fifth exemplary embodiments, excepting that the cover member 152 surrounds one divided section. When a plurality of section units 151 are assembled to form a workpiece unit 150, the cover members 152 form a holding member held by the machining apparatus. A part of one cover member 152 configures a part of the holding member. By assembling a plurality of section units 151, parts of the cover members 152 are to be successive so as to form the holding member surrounding assembled divided sections 142. For example, in a case where the divided sections 142 have a sector shape, parts of the cover members 152 arranged on arc site (portion) of the divided sections 142 configure the holding member. A part of the cover member 152 which does not configure the holding member may act as a cushioning portion for smoothing joint with an adjacent divided section.

The section units 151 may be jointed each other with adhesive material (not shown). Alternatively, an engaging portion may be arranged at a part where the cover members 152 face each other, for engagement of the cover members 152 each other.

FIG. 34 shows a schematic plan view of a section unit in another mode different from the mode shown in FIG. 33. In the mode shown in FIG. 33, the cover member is arranged over an entire circumference of the divided section. In the section unit 153 according to the mode shown in FIG. 34, the cover member 154 is arranged on one site (portion) on a side surface of the divided section 142. The section unit 153 may be assembled like as the assembled portions shown in FIG. 32 so as to form a workpiece unit as shown in FIG. 24. When the section units are assembled, the cover members 154 are arranged at sites which act as the holding member. In the mode shown in FIG. 34, the cover member 154 is arranged along an arc portion of the divided section 142. The cover member 154 is not arranged at a part facing a divided section 142 which is adjacent to it when they are assembled. The section unit 153 shown in FIG. 34 is the same with the modes of the section unit shown in FIG. 33, expecting that arrangement position of the cover member 154 is different.

The section units 153 may be jointed each other with adhesive material (not shown). Or, an engaging portion may be arranged at an area where the divided sections 142 face each other for engagement of the divided sections 142 each other.

The other modes in the sixth exemplary embodiment other than those described above may be the same as those in the first to fifth exemplary embodiments. The sixth exemplary embodiment may be combined with at least one mode mentioned above, if possible.

The sixth exemplary embodiment may exert effects similar with those of the first to fifth exemplary embodiments. Since the section unit may be produced or sold per section unit, a user may produce or purchase a desired section unit and design (set) a desired combination of the compositions in a workpiece unit.

A workpiece unit according to a seventh exemplary embodiment of the present disclosure will be explained. FIG. 35 shows a schematic plan view of a workpiece unit in the seventh exemplary embodiment. FIG. 36 shows a schematic plan view of a dummy workpiece body in the seventh exemplary embodiment. In the sixth exemplary embodiment, a plurality of section units are assembled to form a workpiece unit. In the seventh exemplary embodiment, a workpiece unit 160 is configured using one section unit.

The workpiece unit 160 comprises a section unit 151 and a dummy workpiece body 161. The section unit 151 is the same as the section unit 151 of the sixth exemplary embodiment. The dummy workpiece body 161 is intended to compensate a size of the section unit 151 so that the section unit 151 may be held on the machining apparatus. The dummy workpiece body 161 may comprise a holding portion 161a for holding on the machining apparatus. The holding portion 161a has functions similar to those of the holding member. The holding portion 161a may be integrally formed as a part of the dummy workpiece body 161, or formed by another (separate) member. In modes shown in FIG. 35 and FIG. 36, the dummy workpiece body 161 has a plane shape such that three section units 151 are assembled. In the modes shown in FIG. 35 and FIG. 36, the dummy workpiece body 161 has a plane shape in which it is assembled with the section unit 151 to form a circle shape.

The shape and size of the dummy workpiece body 161 may be designed so as to adapt with the shape and size of the section unit 151. The dummy workpiece body 161 has a thickness capable of being held on the machining apparatus. Material of the dummy workpiece body 161 may be any material if it may be held on the machining apparatus and realize machining of the divided section. As a material of the dummy workpiece body 161, for example, the same material as the holding member may be used.

The dummy workpiece body 161 and the section unit 151 may be jointed with, for example, adhesive material (not shown). Alternatively, engaging portions may be arranged at an area where the dummy workpiece body 161 and the section unit 151 face each other for engagement of the dummy workpiece body 161 and the section unit 151.

It is preferable that the dummy workpiece body 161 may be used repeatedly. It is preferable that the section unit 151 may be detached from the dummy workpiece body 161.

FIG. 37 shows a schematic plan view of a workpiece unit of another mode different from the mode shown in FIG. 35. A workpiece unit 163 comprises a divided section (workpiece body) 144, a dummy workpiece body 164 holding the divided section 144, and adhesive material 145 jointing the divided section 144 and the dummy workpiece body 164. The dummy workpiece body 164 has an annular or tubular structure having an opening cut off in a size of the divided section 144. The dummy workpiece body 164 may comprise a holding part 164a for holding onto the machining apparatus. In the mode shown in FIG. 37, the divided section 144 is fitted to the opening dummy workpiece body 164 in a concentric manner and jointed with the adhesive material 145. A size of the divided section 144 (for example, radius) may be 80% or less, 60% or less, 50% or less, or 40% or less of a size (for example, radius) capable of being held onto the machining apparatus.

It is preferable that the dummy workpiece body 164 has a strength so as not to be deformed upon machining by the machining apparatus.

The other modes in the seventh exemplary embodiment other than those described above may be the same as those in the first to sixth exemplary embodiments. The seventh exemplary embodiment may be combined with at least one mode mentioned above, if possible.

The seventh exemplary embodiment may exert effects similar to those of the first to sixth exemplary embodiments. It is not required to enlarge the workpiece body to a size capable of being held onto the machining apparatus. Thereby, even in a case of a composition of poor demand, machining may be carried out without using any workpiece body having another (different) composition.

A workpiece unit according to an eighth exemplary embodiment of the present disclosure will be explained. In the fifth exemplary embodiment, the divided sections are physically separated from one another. In the eighth exemplary embodiment, at least 2 divided sections in the workpiece body are not physically separated, and they may be integrally formed. A schematic plan view and a schematic sectional view of the workpiece unit in the eighth exemplary embodiment may be the same as those in the FIG. 24 and FIG. 25.

It is preferable that adjacent divided sections 142 are in a bonded (or jointed) state. Therefore, materials of the adjacent divided sections 142 are preferably those capable of being bonded by firing, more preferably those containing the same main material. For example, the adjacent divided sections 142 may be zirconia having different type and/or content ratio in additive(s), such as coloring agent, etc.

A producing method of the workpiece unit of the eighth exemplary embodiment is the same as the producing methods explained in exemplary embodiments mentioned above, expecting that a plurality of divided sections are integrally formed. As to formation of the workpiece body, first, a detachable partition is arranged on a mold so as to form a mold for divided sections having a desired shape. That is, the partition is positioned at a boundary of the divided sections. Next, regions for each of the divided sections are charged with compositions, then the partition is removed. Next, the compositions are subjected to pressurizing formation so that a formed body in which plural compositions are integrated can be formed. A method subsequent to sintering of the formed body is the same as those of the exemplary embodiments mentioned above.

The other modes in the eighth exemplary embodiment other than those described above may be the same as those in the first to seventh exemplary embodiments. The eighth exemplary embodiment may be combined with at least one exemplary embodiment mentioned above, if possible.

The eighth exemplary embodiment may exert effects similar to those of the first to seventh exemplary embodiments. In addition, it requires no members for holding the plurality of divided sections, such as a holding member, adhesive material, etc.

The disclosure in the Patent Literature mentioned herein above is incorporated into the present disclosure by reference thereto. The workpiece unit of the present invention and the producing method thereof is explained based on the exemplary embodiments mentioned above, but not limited to the exemplary embodiments above. Various deformations, modifications and improvements may be applied to variety of disclosed elements (including each element in each claim, each element in each exemplary embodiment or example, each element in each figure, and the like) within the context of entire disclosure of the present invention (including claims and drawings) based on basic technical idea of the present invention. In addition, various combinations, replacements, or selection of variety of disclosed elements (including each element in each claim, each element in each exemplary embodiment or example, each element in each figure, and the like) may be made within the scope of the entire disclosure of the present invention.

Further problems, objectives and development modes of the present invention are apparent from the entire disclosed matters of the present invention including Claims.

With respect to numerical values and ranges disclosed in the present disclosure, it should be interpreted that all numerical values or small ranges (sub-ranges) included in the ranges are specifically disclosed even if there are no explicit recital.

Part or all of the above described exemplary embodiments may be expressed as following supplementary remarks (termed "mode" or "modes"), but not limited thereto.

[Mode 1]
A workpiece unit: comprising
a workpiece body comprising a projecting portion; and
a holding member arranged on at least one part on outside of the projecting portion.

[Mode 2]
The workpiece unit described in Modes, wherein
the workpiece body has a plate shape,
the projecting portion projects from a side surface of the workpiece body, and
the holding member is arranged in at least a projection direction of the projecting portion.

[Mode 3]
The workpiece unit described in Modes, wherein
the workpiece body comprises a first surface, a second surface arranged on a side opposite to the workpiece body, and a circumferential portion between the first surface and the second surface, and
the projecting portion is arranged on the circumferential portion.

[Mode 4]
The workpiece unit described in Modes, wherein
the projecting portion is arranged along the circumferential portion of the workpiece body in a successive manner, and
the holding member has a ring shape.

[Mode 5]
The workpiece unit described in Modes, wherein
the projecting portion comprises a third surface directed in the same direction as the first surface, a fourth surface directed in the same direction as the second surface, and a fifth surface connecting the third surface and the fourth surface, and
the holding member covers at least one part of the fifth surface.

[Mode 6]
The workpiece unit described in Modes, wherein
the holding member comprises a first surface directed in the same direction as the third surface of the projecting portion and a second surface directed in the same direction as the fourth surface of the projecting portion.

[Mode 7]
The workpiece unit described in Modes, wherein
the first surface of the holding member forms a same plane with the third surface of the projecting portion, or is present on a side closer to the first surface of the workpiece body than the third surface of the projecting portion.

[Mode 8]
The workpiece unit described in Modes, wherein
the second surface of the holding member forms a same plane with the fourth surface of the projecting portion, or is present on a side closer to the second surface of the workpiece body than the fourth surface of the projecting portion.

[Mode 9]
The workpiece unit described in Modes, wherein
the holding member further covers at least one part of the third surface and the fourth surface of the projecting portion.

[Mode 10]
The workpiece unit described in Modes, wherein
the workpiece body comprises at least one first positioning portion in the projecting portion at a part facing to the holding member,
the holding member comprises a second positioning portion at a position associated with the first positioning portion at a part facing the circumferential portion, and
at least one part of either of the first positioning portion or the second positioning portion fits with at least one part on the other one.

[Mode 11]
The workpiece unit described in Modes, wherein the first positioning portion has a concave shape or a convex shape, and the first positioning portion and the second positioning portion fit each other on at least one part.

[Mode 12]
The workpiece unit described in Modes, wherein
the first positioning portion is arranged over an entire circumference of the workpiece body.

[Mode 13]
The workpiece unit described in Modes, wherein
the first positioning portion or the second positioning portion has a groove shape.

[Mode 14]
The workpiece unit described in Modes, wherein
the first positioning portion or the second positioning portion has a conical or columnar shape.

[Mode 15]
The workpiece unit described in Modes, wherein
the holding member is jointed to the workpiece body with adhesive material.

[Mode 16]
The workpiece unit described in Modes, wherein
the holding member directly contacts to the workpiece body.

[Mode 17]
The workpiece unit described in Modes, wherein
the projecting portion has a thickness approximately equivalent to that of the holding member.

[Mode 18]
The workpiece unit described in Modes, wherein
the projecting portion has a width of 0.3 mm to 2 mm in a projection direction.

[Mode 19]
The workpiece unit described in Modes, wherein
the projecting portion is arranged at the central area of the workpiece body in a thickness direction.

[Mode 20]
A workpiece unit, comprising
a workpiece body; and
a holding member which is arranged on at least one part of a circumferential portion of the workpiece body and directly contacts to at least one part of the circumferential portion.

[Mode 21]
The workpiece unit described in Modes, wherein
the holding member is arranged along the circumferential portion in a successive manner.

[Mode 22]
The workpiece unit described in Modes, wherein
the holding member has a ring shape.

[Mode 23]
The workpiece unit described in Modes, wherein
a holding member has a thickness thinner than that of the workpiece body.

[Mode 24]
The workpiece unit described in Modes, wherein
the holding member is arranged at the central area of the workpiece body in a thickness direction.

[Mode 25]
The workpiece unit described in Modes, wherein
the holding member is formed of 2 or more parts.

[Mode 26]
The workpiece unit described in Modes, wherein
each of the parts of the holding member respectively comprises a concave portion or a convex portion, and
each of the parts is arranged so that the concave portion and the convex portion are engaged each other.

[Mode 27]
The workpiece unit described in Modes, wherein
the workpiece body is ceramic, metal or resin.

[Mode 28]
The workpiece unit described in Modes, wherein
the workpiece body is semi-sintered body in which zirconia crystal grains are not completely sintered.

[Mode 29]
The workpiece unit described in Modes, wherein
the projecting portion is a part of the semi-sintered body.

[Mode 30]
The workpiece unit described in Modes, wherein
the holding member is made of plastic.

[Mode 31]
The workpiece unit described in Modes, wherein
the workpiece body is formed by machining the workpiece body, and
the workpiece body comprises a machined item connected to the projecting portion or an outer edge portion of the workpiece body.

[Mode 32]
A workpiece unit, wherein
the workpiece unit comprises a workpiece body comprising a plurality of divided sections, and
the divided sections divide a machining target surface of the workpiece body.

[Mode 33]
The workpiece unit described in Modes, wherein
the plurality of divided sections are integrally formed.

[Mode 34]
The workpiece unit described in Modes, wherein
the plurality of divided sections respectively has a different composition.

[Mode 35]
The workpiece unit described in Modes, further comprising a holding member surrounding at least the circumferential portion of the workpiece body.

[Mode 36]
The workpiece unit described in Modes, wherein
the workpiece body is divided into the divided sections.

[Mode 37]
The workpiece unit described in Modes, wherein
at least two divided sections in the plurality of divided sections has a different composition.

[Mode 38]
The workpiece unit described in Modes, wherein
the divided section(s) has(have) a shape engaging with an adjacent divided section.

[Mode 39]
The workpiece unit described in Modes, further comprising cushioning material arranged between adjacent divided sections.

[Mode 40]
The workpiece unit described in Modes, wherein the cushioning material comprises resin.

[Mode 41]
The workpiece unit described in Modes, further comprising a holding member surrounding at least a circumferential portion of the workpiece body.

[Mode 42]
The workpiece unit described in Modes, wherein
the holding member maintains assembling of the plurality of divided sections.

[Mode 43]
The workpiece unit described in Modes, wherein
the holding member is configured from a plurality of portions,
the portions of the holding member are respectively arranged on each of the divided sections of the workpiece body.

[Mode 44]
The workpiece unit described in Modes, further comprising cover member(s) surrounding circumferential portion(s) of the divided section(s).

[Mode 45]
The workpiece unit described in Modes, wherein
the portion of the holding member is at least one part of the cover member.

[Mode 46]
The workpiece unit described in Modes, wherein
the cover member has a shape engaging with a cover member surrounding an adjacent divided section.

[Mode 47]
The workpiece unit described in Modes, wherein
the divided section has a plane sector shape.

[Mode 48]
The workpiece unit described in Modes, wherein
the plurality of divided sections are assembled so as to form the workpiece body.

[Mode 49]
The workpiece unit described in Modes, wherein
the plurality of divided sections respectively has the same shape.

[Mode 50]
The workpiece unit described in Modes, wherein
one divided section in the plurality of divided sections is a portion which is not to be machined by a machining apparatus.

[Mode 51]
The workpiece unit described in Modes, wherein one of the divided sections has a small size which may not be fixed to the machining apparatus.

[Mode 52]
A producing method of a workpiece unit, comprising
a step of preparing a workpiece body,
a step of preparing a holding member having a ring shape,
a step of heating the holding member so as to allow expansion,
a step of inserting the workpiece body into a ring of the holding member, and
a step of cooling the holding member for shrinking so that the holding member is attached onto a circumferential portion of the workpiece body.

[Mode 53]
A producing method of a workpiece unit, comprising
a step of preparing a plurality of divided sections to be components of a workpiece body,
a step of assembling the plurality of divided sections so as to form the workpiece body having a first surface, a second surface at a side opposite to the first surface and a circumferential portion between the first surface and the second surface,
a step of preparing a holding member having a ring shape,
a step of heating the holding member so as to allow expansion,
a step of inserting the workpiece body into a ring of the holding member, and
a step of cooling the holding member for shrinking so that the holding member is attached onto the circumferential portion of the workpiece body.

[Mode 54]
The producing method of the workpiece unit described in Modes, wherein
in the step for expansion of the holding member, the holding member is heated at 60° C. to 150° C.

[Mode 55]
The producing method of the workpiece unit described in Modes, wherein
the holding member comprises engineering plastic.

INDUSTRIAL UTILITY

The present disclosure may be applied to for example, a product of dental prosthetic material.

REFERENCE SIGNS LIST 10, 20, 30, 40, 50, 60, 70, 140, 150, 160, 163: workpiece unit
1, 41, 141: workpiece body
1a, 41a, 141a: first surface
1b, 41b, 141b: second surface
1c: circumferential portion
1d, 1f, 41h, 141d: first positioning portion
1e outer edge portion
2, 52, 62, 72: holding member
2a, 62a: first surface
2b: second surface
2c: inner circumference portion
2d, 2f, 52a, 62b, 72c: second positioning portion
3: adhesive material
4: machined item
4a: connecting part
5: cutting part
41c, 141c: projecting portion
41d: third surface
41e: fourth surface
41f: fifth surface
41g: circumferential portion
72a: first part
72b: second part
142, 144: divided section
142a to 142f: first to sixth divided sections
142g: concave portion
142h: convex portion
143: cushioning (buffer) material
145: adhesive material
151, 153: section unit
152, 154: cover member
161, 164: dummy workpiece body
161a, 164a: holding part

The invention claimed is:

1. A workpiece unit, comprising:
a workpiece body; and
a holding member having an inner circumferential portion that directly contacts over an entire circumference on at least one part of a circumferential portion of the workpiece body,
wherein:
the workpiece body itself comprises at least one first positioning portion which is integral with and formed from the same material as the workpiece body and is arranged over an entire circumference of the workpiece body and at a part facing the holding member,
the holding member itself comprises a second positioning portion engaged with the first positioning portion over an entire circumference of the workpiece body,
the holding member is made of plastic,
information including any of a lot number, a color or shade, a shrinkage ratio and a discrimination for upper/lower sides is given to the holding member,
the holding member is held by a machining apparatus,
the workpiece body comprises a first surface, a second surface on an opposite side to the first surface, and a circumferential portion arranged between the first surface and the second surface,
the circumferential portion and the inner circumferential portion are not oriented in the same direction as either of the first surface and the second surface,
the workpiece body comprises a projecting portion projecting from the circumferential portion,
the first positioning portion is arranged on the projecting portion, and
the holding member is arranged in at least a projection direction of the projecting portion.

2. The workpiece unit according to claim 1, wherein:
the first positioning portion has a concave shape or a convex shape,
the second positioning portion has a shape which is fitted or engaged with the first positioning portion, and
at least one part of either of the first positioning portion or the second positioning portion is fitted or engaged with at least one part of the other one.

3. The workpiece unit according to claim 1, wherein:
either of the first positioning portion or the second positioning portion has a concave shape and the other one has a convex shape,
the convex shape has a width equivalent or more to that of the concave shape, and
a part of the convex shape is inserted into the concave shape.

4. The workpiece unit according to claim 1, wherein the first positioning portion or the second positioning portion has a groove shape.

5. The workpiece unit according to claim 1, wherein the first positioning portion or the second positioning portion has a conical or columnar shape.

6. The workpiece unit according to claim 1, wherein:
the projecting portion is arranged along the circumferential portion of the workpiece body in a successive manner, and
the holding member has a ring shape.

7. The workpiece unit according to claim 1, wherein:
the workpiece body comprises a first surface and a second surface arranged on a side opposite to the first surface,
the circumferential portion is arranged between the first surface and the second surface,
the projecting portion comprises a third surface directed in the same direction as the first surface, a fourth surface directed in the same direction as the second surface, and a fifth surface connecting the third surface and the fourth surface, and
the holding member covers at least one part of the fifth surface.

8. The workpiece unit according to claim 7, wherein the holding member comprises a first surface directed in the same direction as the third surface of the projecting portion and a second surface directed in the same direction as the fourth surface of the projecting portion.

9. The workpiece unit according to claim 7, wherein the first surface of the holding member forms a same plane with the third surface of the projecting portion, or is present on a side closer to the first surface of the workpiece body than the third surface of the projecting portion.

10. The workpiece unit according to claim 7, wherein the second surface of the holding member forms a same plane with the fourth surface of the projecting portion or is present on a side closer to the second surface of the workpiece body than the fourth surface of the projecting portion.

11. The workpiece unit according to claim 7, wherein the holding member further covers at least one part of the third surface and the fourth surface of the projecting portion.

12. The workpiece unit according to claim 1, wherein the projecting portion has a thickness equivalent to that of the holding member.

13. The workpiece unit according to claim 1, wherein the projecting portion has a width of 0.3 mm to 2 mm in a projection direction.

14. The workpiece unit according to claim 1, wherein the projecting portion is arranged at the central area of the workpiece body in a thickness direction.

15. The workpiece unit according to claim 1, wherein the workpiece body is formed by machining the workpiece body, and comprises a machined item connected to the projecting portion or an outer edge portion of the workpiece body.

16. The workpiece unit according to claim 1, wherein the holding member is formed of 2 or more parts.

17. The workpiece unit according to claim 16, wherein:
each of the parts of the holding member respectively comprises a concave portion or a convex portion, and
each of the parts is arranged so that the concave portion and the convex portion are engaged each other.

18. The workpiece unit according to claim 1, wherein the workpiece body is ceramic, metal or resin.

19. The workpiece unit according to claim 1, wherein the workpiece body is semi-sintered body in which zirconia crystal grains are not completely sintered.

20. The workpiece unit according to claim 1, wherein the holding member is jointed onto the workpiece body with adhesive material.

21. The workpiece unit according to claim 1, wherein the holding member directly contacts to the workpiece body.

22. The workpiece unit according to claim 1, wherein the workpiece body is manufactured by pressure-molding a composition for the workpiece body into a predetermined shape configured to form the workpiece body.

* * * * *